(12) United States Patent
Koike et al.

(10) Patent No.: US 9,329,998 B2
(45) Date of Patent: May 3, 2016

(54) INFORMATION PROCESSING APPARATUS AND SCHEDULING METHOD

(71) Applicant: FUJITSU LIMITED, Kawasaki-shi, Kanagawa (JP)

(72) Inventors: Nobuyuki Koike, Kawasaki (JP); Toshihiro Miyamoto, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 163 days.

(21) Appl. No.: 14/184,419

(22) Filed: Feb. 19, 2014

(65) Prior Publication Data

US 2014/0173202 A1 Jun. 19, 2014

Related U.S. Application Data

(63) Continuation of application No. PCT/JP2011/068921, filed on Aug. 23, 2011.

(51) Int. Cl.
G06F 12/00 (2006.01)
G06F 12/08 (2016.01)
G06F 13/16 (2006.01)
G06F 13/00 (2006.01)

(52) U.S. Cl.
CPC .......... *G06F 12/0802* (2013.01); *G06F 12/08* (2013.01); *G06F 13/00* (2013.01); *G06F 13/1605* (2013.01); *G06F 13/1689* (2013.01); *Y02B 60/1225* (2013.01)

(58) Field of Classification Search
USPC ........................................................ 711/118
See application file for complete search history.

(56) References Cited

U.S. PATENT DOCUMENTS

| 5,761,406 A | 6/1998 | Kobayashi et al. |
| 6,125,450 A | 9/2000 | Kardach |
| 2001/0032298 A1 | 10/2001 | Emons et al. |

FOREIGN PATENT DOCUMENTS

| JP | 2000-090045 | 3/2000 |
| JP | 2003-256353 | 9/2003 |
| JP | 2003-530640 | 10/2003 |
| JP | 2005-190332 | 7/2005 |
| JP | 2009-282880 | 12/2009 |

OTHER PUBLICATIONS

KROA—Office Action mailed on Mar. 11, 2015 for Korean Patent Application No. 10-2014-7004632, with full English translation.

(Continued)

*Primary Examiner* — Jared Rutz
*Assistant Examiner* — Hamdy S Ahmed
(74) *Attorney, Agent, or Firm* — Fujitsu Patent Center

(57) ABSTRACT

An information processing apparatus includes: at least one access unit that issues a memory access request for a memory; an arbitration unit that arbitrates the memory access request issued from the access unit; a management unit that allows the access unit that is an issuance source of the memory access request according to a result of the arbitration made by the arbitration unit to perform a memory access to the memory; a processor that accesses the memory through at least one cache memory; and a timing adjusting unit that holds a process relating to the memory access request issued by the access unit for a holding time set in advance and cancels the holding of the process relating to the memory access request in a case where power of the at least one cache memory is turned off in the processor before the holding time expires.

20 Claims, 16 Drawing Sheets

(56) References Cited

OTHER PUBLICATIONS

EESR—Extended European Search Report mailed on Jul. 8, 2015 for corresponding European Patent Application No. 11871370.0.

International Search Report, mailed in connection with PCT/JP2011/068921 and mailed Sep. 20, 2011.

CNOA—Chinese Office Action mailed on Nov. 9, 2015 for corresponding Chinese Patent Application No. 201180072989.1, with English translation.

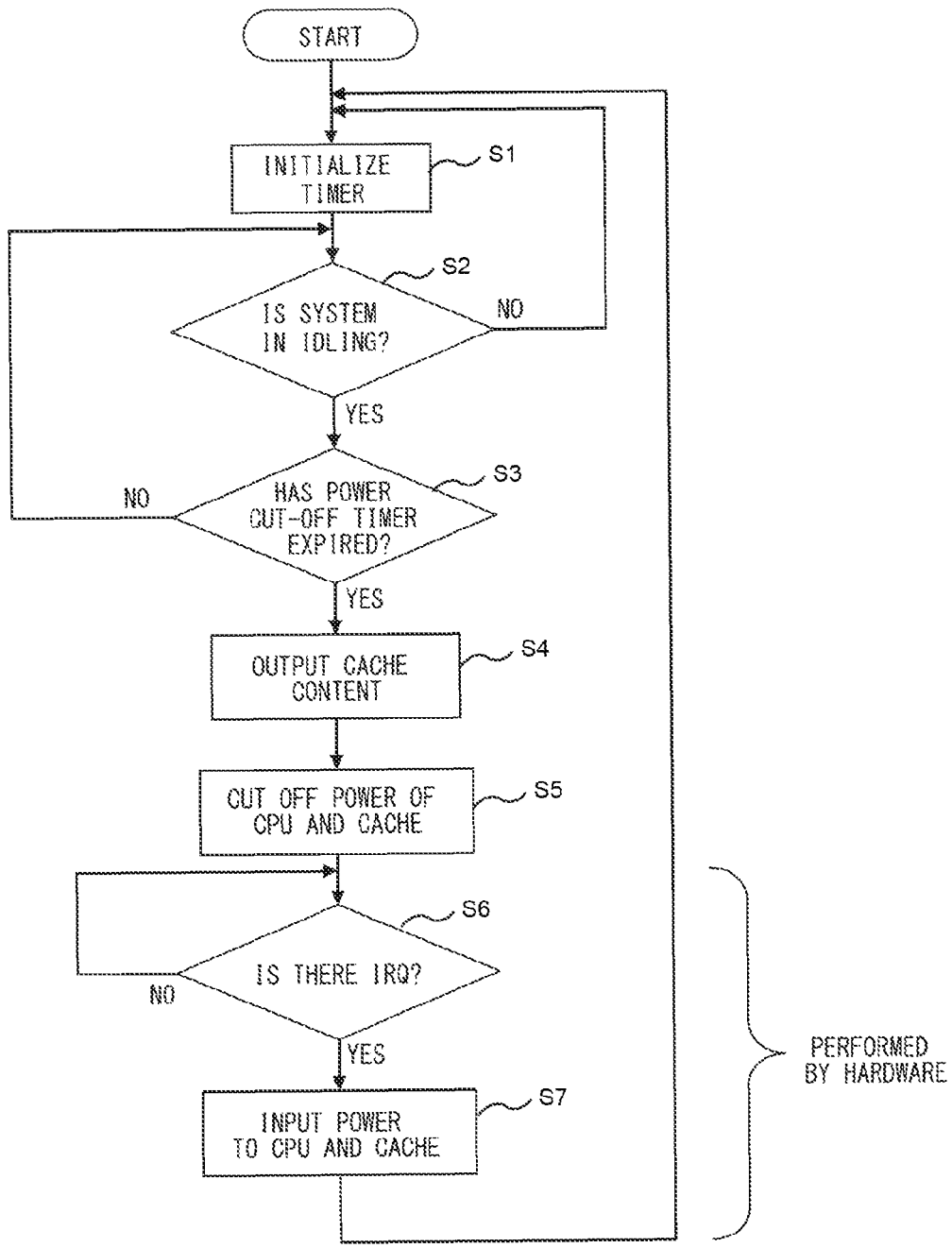

INFORMATION PROCESSING APPARATUS AND SCHEDULING METHOD

CROSS-REFERENCE TO RELATED APPLICATION

This application is a continuation application of International Application PCT/JP2011/068921 filed on Aug. 23, 2011 and designated the U.S., the entire contents of which are incorporated herein by reference.

FIELD

The present invention relates to an information processing apparatus including a device that issues a memory access request and a scheduling method of a process relating to a memory access request.

BACKGROUND

In a so-called computer system such as a server or a personal computer (PC), there is a method of using a system bus called DMA (direct memory access). According to the DMA, the use of a system bus that is normally performed by a CPU (central processing unit) is permitted also to devices (bus master) other than the CPU. In addition, in a multi-processor system including a plurality of CPUs (or CPU cores), the plurality of CPUs are designed to exchange the use of a system bus with one another.

A system in which there are a plurality of devices (including a CPU) permitted to use a system bus is called a multi-master system, and the bus used in the multi-master system is called a multi-master bus.

In the multi-master system, it is one device including the CPU that can use the bus at a certain timing. Accordingly, the multi-master system includes an arbitration circuit (bus arbiter) that arbitrates issued DMA requests when the DMA requests are issued from a plurality of devices at a certain timing and gives a DMA permission to one device thereof.

FIG. 14 is a diagram that illustrates an example of the configuration of a computer system (multi-master system) 100 including a device that issues a DMA request, and FIG. 15 is a diagram that illustrates an example of the configuration of a bus arbiter 400 that arbitrates DMA requests in the computer system 100.

In the example illustrated in FIG. 14, devices that are DMA factors in the computer system 100 are HDDs (hard disk drives), which are not illustrated in the figure, corresponding to a USB (universal serial bus) interface and an SATA (serial advanced technology attachment) interface. The computer system 100 includes a USB host controller (UHCI: universal host controller interface) and an SATA host controller (AHCI: advanced host controller interface) as controllers that are used for connecting such devices to a system bus 600.

Such host controllers are configured as PCI devices 300-1 to 300-3 and are connected to a PCI bus that is the system bus 600. DMA requests generated from the PCI devices 300-1 to 300-3 are arbitrated by a bus arbiter 400 that is compliant with the PCI bus specification and are issued as access requests (DMA requests) to a main memory 1000 for a bus arbiter 820.

More specifically, as illustrated in FIG. 14, the PCI devices (a plurality of bus master devices) 300-1 to 300-3 serving as DMA request issuing sources issue DMA requests (access requests to make access to the main memory 1000) denoted by broken-line arrows A to C to the bus arbiter 400.

In the bus arbiter 400, as illustrated in FIG. 15, input timings of the DMA requests A to C are adjusted by a synchronization processing unit 410. An arbitration processing unit 420 that has received the DMA requests A to C requests a permission to use the host bus 810 by issuing a DMA request D to the bus arbiter 820 disposed on the high-level bus (host bus 810) side through a bus bridge 700. In the bus arbiter 820, it is determined whether or not the use of the host bus 810 is permitted in accordance with the use state of the host bus 810 for the DMA request. When the use of the host bus 810 is permitted by the bus arbiter 820, and a DMA permission signal E is transmitted, in the bus arbiter 400, a DMA request is arbitrated (selected) by the arbitration processing unit 420, and the output timing is adjusted by the synchronization processing unit 430. Then, DMA permissions (output signals; see A' to C' illustrated in FIGS. 14 and 15) are output to the PCI devices 300-1 to 300-3 corresponding to the selected (accepted) DMA requests from the bus arbiter 400. The device (any one of the PCI devices 300-1 to 300-3) that has received these output signals A' to C' acquires the right of use of the host bus 810.

Here, the use of the host bus 810 is performed by transmitting a bus command representing the type (read, write, or the like) of the access together with a memory address desired to be accessed from the bus master. In other words, the use of the host bus 810 that is made by the bus master is performed similarly to a read/write operation of the data of a device, which is made by the CPU, using the host bus 810.

In the process of the wide spreading of the PCI bus specification, the relation between a DMA operation and the total performance of a system has been researched and enlightened, and it is known that performing DMA request in small pieces in a system lowers the efficiency of the entire system. In other words, the amount of data that is read/written from/into the main memory 1000 increases in accordance with a DMA performed by the bus master (for example, about several K bytes to several M bytes). Accordingly, in the computer system 100, when access permission is given for DMA requests in small pieces (for example, for each several bytes), the issuance of a DMA request and the permission thereof are repeatedly performed, whereby the processing efficiency of the entire system is lowered.

For such a reason and the like, the bus arbiter 400 is designed so as to respond to a DMA request at higher speed.

Meanwhile, there are cases where a large-capacity cache memory (hereinafter, referred to as a CM) 220 is mounted in a CPU in accordance with an increase in the processing speed of a recent computer system. A multi-master system in which such a CPU is mounted is desired to have a bus snoop function.

In the CM 220, a set of data and address information representing a place in the main memory 1000 at which the data is present is stored. When each device on the bus performs a write operation for the main memory 1000 using the host bus 810, in order to maintain coherency between the main memory 1000 and the CM 220, data written into the main memory 1000 through a memory controller 900 needs to be reflected also on the CM 220 of the CPU.

According to the bus snoop function, each device on the host bus 810 monitors the operation of the bus and detects whether or not address information corresponding to a memory address 1000 transmitted on the host bus 810 is present in the CM 220 included therein. When the address information corresponding to the memory address transmitted on the host bus 810 is detected from the CM 220 included therein, each device on the host bus 810 performs update of the CM 220, or the like, in accordance with the address information. In this manner, each device compares a memory address flowing on the host bus 810 and all the address information stored in the CM 220 with each other every time when any one of all the access operations is performed.

Next, the power control of a CPU including the CM 220 will be described.

Tasks executed by the CPU are managed by an OS (operating system), and, in a case where there is no executed task (in the case of an idle state), the OS suppresses unnecessary power consumption of the CPU by stopping the CPU or turning off the power of the CPU. For example, in a case where the CPU includes a write-back-type CM 220, before the OS turns off the power, the CPU performs a process of reflecting data stored in the CM 220 on the main memory 1000.

This reflection process performed by the CPU is performed by searching a portion that is different from the content of the main memory 1000 from the CM 220 and writing data of the different portion into the main memory 1000. It takes a time according to the size of the CM 220 and the performance of the memory to perform this reflection process. In recent years, there are CPUs each including a CM 220 having a capacity of about 6 M bytes, and, in order to write all the content of the CM 220 into the main memory 1000 by the reflection process performed by the CPU, it may take several milliseconds.

In addition, the computer system performing such power control may include hardware that automatically turns on the power of the CPU and the CM. 220 by being triggered upon an interrupt request (IRQ) that is generated in a case where a new task is executed after the power of the CPU is turned off.

Next, the sequence of the power control of the CPU will be described with reference to FIG. 16.

FIG. 16 is a flowchart that illustrates an example of power control of a CPU including the CM 220 in the idle state of the OS.

First, a power-off timer included in each CPU (CPU core 210) is initialized and started counting by the OS (Step S1), and it is determined whether a system (or a task) assigned to each CPU is in the idle state (Step S2).

When the system is not in the idle state, in other words, when the system is in execution (No Route of Step S2), the processes of Steps S1 and S2 are performed until the system enters the idle state, for example, for every predetermined time. On the other hand, when the system is in the idle state (Yes Route of Step S2), it is determined whether or not the power-off timer has expired for each CPU (core 210) corresponding to the system (or the task) that is in the idle state by the OS (Step S3).

In a case where the power-off timer has not expired (No Route of Step S3), the process proceeds to the process of Step S2. On the other hand, in a case where the power-off timer has expired (Yes Route of Step S3), the content of the CM 220 included in the CPU is output to the main memory 1000 (Step S4). Then, the power of the CPU including the CM 220 is cut off by the OS (Step S5).

Subsequently, when it is determined that an IRQ has been generated by hardware that detects the IRQ (Yes Route of Step S6), power is input to the CPU and the CM 220 (Step S7), and the process relating to the system and the bus snoop process are performed by the CPU. In addition, when power is input to the CPU in Step S7, the process proceeds to the process of Step S1. In addition, until an IRQ is generated, the power-off the CPU and the CM 220 is maintained (Step S6 and No Route of Step S6).

According to such a process, the power of the CPU is controlled.

In addition, as a relating technology, there is a technology in which a DMA unit control unit requests the right of use of the system bus from a CPU or opens the right of use of the system bus to the CPU in accordance with the state of a DMA operation enable signal while a DMA transmission request signal that is in the On state is supplied from the CPU for efficiently performing data transmission and enabling data transmission in a DMA mode without exclusive use of the bus.

Furthermore, as another relating technology, there is a technology for achieving low power consumption by performing clock control for collectively performing DMA by supplying a high-speed clock only for a required period at a timing at which DMA transmission is performed from a clock generating unit in accordance with an instruction from a transmission control unit to a CPU, which is in the sleep state, and the memory.

As the capacity of the CM increases, address information that is compared by the CPU in the bus snoop process increases.

Patent Literature 1: Japanese Laid-open Patent Publication No. 2000-90045

Patent Literature 2: Japanese Laid-open Patent Publication No. 2005-190332

Since the CM is disposed so as to perform data exchange between the CPU and the main memory at high speed, it is not preferable from the viewpoint of an increase in the processing time for the CPU to sequentially compare the address information in accordance with the bus snoop process when data flows on the host bus. Thus, for example, while a configuration may be considered in which comparators corresponding to a required number are included, and comparison operations thereof are performed at the same time, power corresponding to the number of the comparators is consumed. While this power consumption is different in accordance with the capacity, the cache system, and the like of the CM, in recent years in which the implementation of high capacity and high speed of the CM has progressed, there is also an example in which the CM uses about 40% of the power consumed by the CPU.

By the way, in recent years, while there are cases where a CPU has a function for power control, it is difficult to suppress the power consumption of the CM. The reason for this is that, even in a case where the power consumption can be reduced by stopping the operation, as long as another bus mater uses the host bus, the CPU needs to allow at least the part of the CM to be in the operation state for a bus snoop.

In order to reduce the power consumption of the CM, the content of the CM is vacated, and then, the cache operation thereof is stopped. However, as described above, the burden for vacating the CM is large, and, particularly, in a case where the CM of the write-back-type is used, corresponding time and power are needed. In addition, in a state (power-off state) in which the CM does not operate, it is difficult to achieve regular performance even by operating the CPU, and, in order to restart the operation of the CPU, the CM is returned to be in the operation state as well.

As above, since time and power are taken also for a state transition between a stop state and an operation state of the CM, there are cases where the power consumption rather increases as the frequency of the transition increases. The frequency of the transition changes in accordance with the number of devices making a DMA request and an interrupt request and changes also in accordance with the performance of the memory. In addition, when a time until a DMA request or an interrupt process request is received is long, the performance of the device may be degraded, or the device may be incapable of continuing the operation at the worst. Accordingly, conventionally, a computer system (a host bus or the like) is frequently designed to suppress a reduction of the processing speed by responding to an interrupt request from each device as soon as possible, and there is a problem that the reduction of the power consumption does not advance.

As above, in a case where a DMA is generated in the multi-master system, the bus snoop process is performed by the CPU, and there is a problem that the power consumption of the CPU (CM) increases.

In addition, in a case where a DMA is generated in a state in which the power of the CPU is cut off by the OS, power is input to the CPU (CM), and the CM transits from the stop state to the operation state, whereby there is a problem in that the processing time and the power consumption increase.

SUMMARY

According to an aspect of the embodiments, an information processing apparatus includes at least one access unit that issues a memory access request for a memory; an arbitration unit that arbitrates the memory access request issued from the access unit; a management unit that allows the access unit that is an issuance source of the memory access request according to a result of the arbitration made by the arbitration unit to perform a memory access to the memory; a processor that accesses the memory through at least one cache memory; and a timing adjusting unit that holds a process relating to the memory access request issued by the access unit for a holding time set in advance and cancels the holding of the process relating to the memory access request in a case where power of the at least one cache memory is turned off in the processor before the holding time expires.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 16 is a flowchart that illustrates an example of power control of a CPU including a CM.

DESCRIPTION OF EMBODIMENTS

Hereinafter, embodiments will be described with reference to the drawings.

[1] Embodiment

[1-1] Example of Configuration of Information Processing Apparatus

Figure 1:
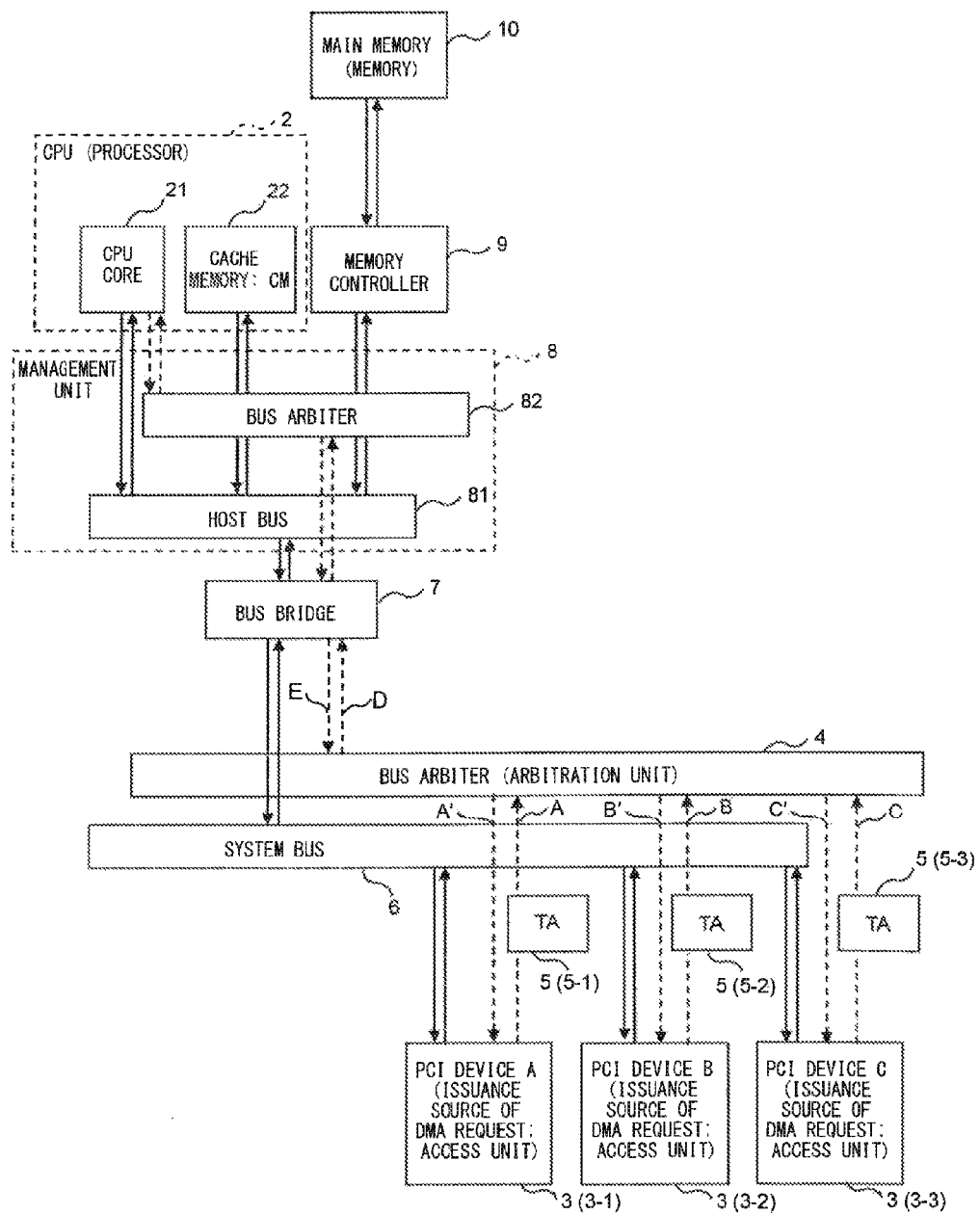
FIG. 1 is a diagram that illustrates an example of the configuration of an information processing apparatus according to an embodiment.
Figure 2:
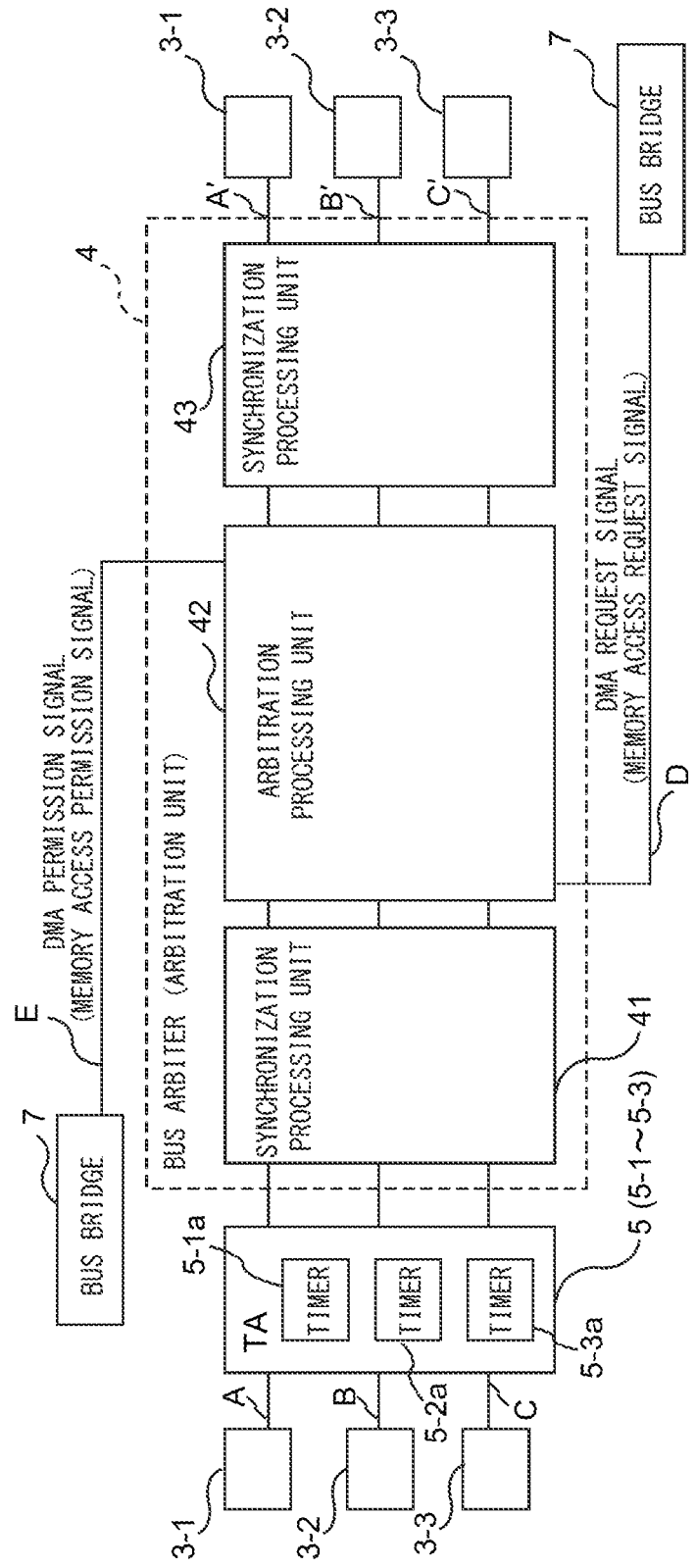
FIG. 2 is a diagram that illustrates an example of the configuration of a bus arbiter of the information processing apparatus according to this embodiment.

FIG. 1 is a diagram that illustrates an example of the configuration of an information processing apparatus 1 according to an embodiment, and FIG. 2 is a diagram that illustrates an example of the configuration of a bus arbiter 4 of the information processing apparatus 1.

The information processing apparatus 1 is a computer system (multi-master system) such as a server or a PC and includes: at least one (one in the example illustrated in FIG. 1) CPU (processor) 2 that includes a CPU core 21 and a CM 22; and PCI devices 3-1 to 3-3 that are capable of executing DMA. In addition, the information processing apparatus 1 includes: a bus arbiter 4; timing adjusters (hereinafter, referred to as TAs) 5-1 to 5-3; a system bus 6; a bus bridge 7; a management unit 8 that includes a host bus 81 and a bus arbiter 82; a memory controller 9; and a main memory 10.

Here, in the information processing apparatus 1 according to this embodiment, a bus snoop process is performed for address information and data that pass through the host bus 81 by the CPU 2.

In addition, in the information processing apparatus 1, power control of the CPU 2 as illustrated in FIG. 16 is performed by the OS executed by the CPU 2. In other words, in the information processing apparatus 1, in a case where the system (or the task) is in the idle state, the power of the CPU 2 that includes the CM 22 is cut off by the OS.

The CPU core 21 is a processing device that performs various control operations and arithmetic operations and realizes various functions by executing programs that are stored in the PCI devices 3-1 to 3-3, a ROM (read only memory) not illustrated in the figure, or the like.

The CM 22 maintains data that is transmitted between the CPU core 21 and the main memory 10 and the address information of the data, and the CPU 2 accesses the main memory 10 through at least one CM 22. Here, it is assumed that the CM 22 according to this embodiment employs the write back type.

The main memory (main memory device; memory) 10 is a storage device that temporarily stores various kinds of data and programs and temporarily stores and expands data or a program to be used when the CPU 2 executes the program. As the main memory 10, for example, there is a volatile memory such as a RAM (random access memory).

The memory controller 9 controls access from the CPU 2 or the PCI devices 3-1 to 3-3 as bus masters to the main memory 10 and the like.

Each one of the PCI devices 3-1 to 3-3 is a host controller such as an UHCI or an AHCI connected to the system bus 6, and storage devices such as an HDD not illustrated in the figure and the like are connected thereto through interfaces such as a USB and an SATA. The HDD and the like store data and programs and are accessed by the CPU 2 and configured as DMA factors for the main memory 10.

In addition, the PCI devices 3-1 to 3-3 (hereinafter, in a case where the PCI devices 3-1 to 3-3 do not need to be discriminated from one another, they will be simply denoted by reference numeral 3) serve as bus masters (issuance sources of DMA requests; access units) that issue DMA requests (memory access requests) A to C for the main memory 10.

The bus arbiter (arbitration unit) 4 arbitrates the DMA requests A to C issued from the PCI devices 3 and, as illustrated in FIG. 2, similar to the bus arbiter 400 described above, includes synchronization processing units 41 and 43 and an arbitration processing unit 42.

In addition, the bus arbiter 4 includes registers 44-1 to 44-3 that correspond to TAs 5-1 to 5-3 to be described later.

The synchronization processing unit 41 adjusts the input timings of the DMA requests A to C issued from the PCI devices 3-1 to 3-3, and the synchronization processing unit 43 adjusts the output timings of DMA permissions (memory access permissions; output signals) A' to C' that represent a result of the arbitration performed by the bus arbiter 4.

The arbitration processing unit 42 arbitrates the DMA requests A to C of which the input timings have been adjusted by the synchronization processing unit 41, accepts one of the DMA requests and outputs an output signal (one of the output signals A' to C') corresponding to the accepted DMA request. The PCI device 3 to which this output signal A', B', or C' has been input acquires a right of use of the host bus 81 and performs DMA.

In addition, the arbitration processing unit 42 adjusts the input DMA requests A to C in accordance with arbitration conditions set in advance. As the arbitration conditions, for example, there are conditions such as priority levels among devices issuing DMA requests, order of arrival (first-come first-served), and a probability distribution.

In addition, when the DMA requests A to C are input, the arbitration processing unit 42 issues a DMA request D to a management unit 8 (a bus arbiter 82 that is disposed on the host bus 81 side that is a high-level bus) through the bus bridge 7. When a DMA permission signal E for the DMA request D is received from the management unit 8, the arbitration processing unit 42 performs an arbitration process relating to the input DMA requests A to C.

The host bus 81 is a bus that transmits data or the like among the CPU 2, the other devices not illustrated in the figure, the memory controller 9, and the bus bridge 7, and the CPU core 21 accesses the CM 22 or the memory controller 9 through the host bus 81. In addition, the host bus 81 transmits address information or data that is transmitted and received between the PCI device 3 and the main memory 10 (memory controller 9) according to the DMA.

The bus arbiter 82 arbitrates access to the host bus 81 from the CPU 2 and the other devices not illustrated in the figure. In addition, when the DMA request D is input from the bus arbiter 4, the bus arbiter 82 transmits the DMA permission signal E in accordance with the use state of the host bus 81.

More specifically, when the DMA request D is input from the bus arbiter 4, the management unit 8 (bus arbiter 82) determines whether to allow the DMA issuance source to use the host bus 81 in accordance with the use state of the host bus 81, in other words, whether to permit access to the main memory 10. Then, in a case where access to the main memory 10 using the host bus 81 is permitted for the DMA request D, the management unit 8 transmits (validates; asserts) the DMA permission signal E. As a case where the use permission of the host bus 81 is given by the management unit 8, for example, there is a case where the host bus 81 is not used by the CPU 2 or the other devices or the like.

The bus arbiter 4 that has been permitted to access the main memory 10 by the management unit 8 in accordance with the DMA permission signal E issues a DMA permission (output signal) to a PCI device 3 according to the arbitration result, and the PCI device 3 that has received the output signal performs memory access to the main memory 10 in accordance with the issued output signal.

According to the above-described operation, the management unit 8 allows the PCI device 3 that is the issuance source of the DMA request according to the arbitration result acquired by the bus arbiter 4 to perform DMA (memory access) to the main memory 10.

In addition, the PCI device 3 that is permitted to use the host bus 81 by the management unit 8 and the bus arbiter 4 transmits data to be written to the system bus 6 in a case where write access is performed by using the host bus 81. On the other hand, in a case where read access is performed by using the host bus 81, the PCI device 3 waits for the transmission of read data from the main memory 10 to the system bus 6 and receives the read data.

The system bus 6 is a bus to which addresses of access destinations relating to the DMA requests A to C issued from the PCI devices 3, data to be read or written, and the like are transmitted and, for example, is a PCI bus.

The bus bridge 7 is a device that exchanges a bus cycle between the system bus 6 (and the bus arbiter 4) and the host bus 81 (and the bus arbiter 82).

In addition, the bus bridge 7 detects the cut-off of the power of the CPU 2 according to the power control performed by the OS.

More specifically, the bus bridge 7 is configured such that the state of the power of at least the CM 22 of the CPU 2 is acquired (notified) from a power supply circuit, which is not illustrated in the figure, managing the power of the CPU 2. In other words, in a case where power supplied to the CPU 2 is cut off in accordance with the power control of the CPU 2 that is performed by the OS, and the power of at least one CM 22 is off, the bus bridge 7 can acquire (be notified) that at least one CM 22 is in the power-off state from the power supply circuit.

The TAs (timing adjusting unit) 5-1 to 5-3 (denoted simply by reference numeral 5 in description to be presented below in a case where the TAs 5-1 to 5-3 do not need to be discriminated from one another) hold the processes relating to the DMA requests A to C issued by the PCI devices 3 for a holding time that is set in advance.

The TAs 5-1 to 5-3 illustrated in FIGS. 1 and 2 are respectively included in the PCI devices 3. As illustrated in FIG. 2, the TAs 5-1 to 5-3 include timers 5-1a to 5-3a that designate the holding times of the DMA in correspondence with the PCI devices 3.

While the information processing apparatus 1 according to this embodiment includes a plurality of TAs 5 each including one timer, the present invention is not limited thereto, but the information processing apparatus 1 may include one TA 5 that includes a plurality of the timers 5-1a to 5-3a. In FIG. 2, the TA 5 is represented as one block.

Here, the process relating to the DMA request represents the issuance of the DMA requests A to C from the PCI devices 3 to the bus arbiter 4 in the example illustrated in FIGS. 1 and 2. In other words, in the example illustrated in FIGS. 1 and 2, the TA 5 holds the DMA requests A to C issued from corresponding PCI devices 3 for a holding time set in advance.

[1-2] Description of TA

As described above, when a DMA operation according to the PCI device 3 is generated, the CPU 2 performs a bus snoop process of the CM 22. In other words, when a DMA operation according to the PCI device is performed while the power of the CPU 2 is cut off, the bus snoop process of the CM 22 is not necessary. The reason for this is that the CPU 2 (and the CM 22) that has stopped once does not need to perform the bus snoop operation only for responding to the use request from the host bus 81, and the storage area of the CM 22 is vacated in accordance with the cut-off of the power.

Here, while it is preferable that the PCI devices 3 issue the DMA requests A to C to match the timing at which the power of the CPU 2 is cut off, the timings at which the DMA requests A to C are issued are determined irregularly in accordance with each peripheral device and the CPU 2, and accordingly, it is difficult to perform control using the PCI devices 3.

Thus, the information processing apparatus 1 of this embodiment includes the TA 5 used for waiting for the timing at which the power of the CPU 2 is cut off in the previous stage of the bus arbiter 4 and adjusts the issuance timings of the DMA requests A to C issued from the PCI devices 3 by using the TA 5. Then, by delaying the DMA requests A to C as much as possible by using the TA 5, the probability of the inputs of the delayed DMA requests A to C to the bus arbiter 4 being in correspondence with the timing of the cut-off of the power of the CPU 2 can be raised.

Therefore, the information processing apparatus 1 of this embodiment causes the DMA requests to wait until it is the timing of the cut-off of the power of the CPU 2 using the TA 5, and accordingly, the bus snoop operation according to the CPU 2 is inhibited, whereby the total power consumption of the information processing apparatus 1 can be reduced.

Here, the degree of a time for which the DMA requests A to C are held by the TA 5 matters. A maximum holding time (delay limit time) for which the issued DMA requests A to C may be held changes in accordance with the peripheral device (the PCI device 3) and the CPU 2. However, the peripheral device is designed not to fail even when waiting for at least a time taken for a state transition until the supply of power from the power-off state of the CPU 2 in the power control of the CPU 2 according to the OS.

Accordingly, it is preferable that the holding time set for the TA 5 be determined in accordance with a delay limit time (maximum holding time) for which the delay is allowed in the PCI device 3 that is the issuance source of a corresponding DMA request.

As above, as one factor for delaying the DMA request of the peripheral device, the PCI bus has been standardized. In the PCI bus, in order to raise the use efficiency, a burst access is recommended in which an area of some degree is accessed together. In order to perform the burst access, each device is desired to have a buffer having a capacity that corresponds to the amount of data transmitted by the burst access. As the capacities of the buffers of devices increase, devices capable of accommodating a relatively long waiting time are widely used. While there is a difference in accordance with devices, as the delay limit time for which the delay of the DMA request is allowed, it is considered that there is a margin of about 100 µs.

In this embodiment, a maximum holding time is registered in each PCI device 3 in advance, and maximum holding times of corresponding PCI devices 3 are set in the TAs 5-1 to 5-3.

In addition, the information processing apparatus 1 may be configured to generate an interrupt IRQ for the CPU 2 for every predetermined time. In the information processing apparatus 1 in which the interrupt is generated, in a case where the system is in the idle state, the power is cut off right after the interrupt process. Since the operation timing of the CPU 2 is managed by the OS, the OS can acquire a time until the next interrupt process is performed. Accordingly, as the holding time set for the TA 5, a time until the next process, in other words, the cut-off of the power of the CPU 2 is performed after a DMA request is issued from the PCI device 3 may be set.

Furthermore, depending on the performance taken for the system of the information processing apparatus 1, the holding time set for each TA 5 may be fixed (constant).

In addition, it may be configured such that a mechanism monitoring a time for which the process relating to a DMA request has held for each PCI device 3, the occurrence of an error as a result of the holding, and the like are arranged, and the holding time to be set in the TA 5 is experimentally determined based on the result of the monitoring process. In a case where an error occurs as a result of the holding of the process relating to the DMA request, an error recovery process is preferably performed. The error process and the recovery process may be performed using various known techniques, and detailed description thereof will not be presented here.

As described above, when the DMA requests A to C are input, in a case where the CPU 2 (the CM 22) is in the turned-on state, the TA 5 according to this embodiment holds the process relating to the DMA requests. On the other hand, in a case where the power of at least one CM 22 of the CPU 2 enters the turned-off state before the holding time expires, the TA 5 cancels the holding of the processes relating to the DMA requests.

In addition, also in a case where the holding time expires, in other words, in a case where the time for which the DMA requests are held exceeds the maximum holding time, the TA 5 cancels the holding of the processes relating to the DMA requests.

When the holding of the DMA requests from the holding PCI devices 3 is cancelled, the TA 5 inputs the DMA requests to the bus arbiter 4.

Here, the TA 5 detects a power cut-off state of the CPU 2 (CM 22) by acquiring (receiving a notification of) the state from the bus bridge 7 described above.

In addition, when the DMA requests A to C are issued, in a case where the CPU 2 (CM 22) is in the power cut-off state, in other words, while the power of at least one CM 22 is in the turned-off state, the TA 5 inhibits the holding of the processes relating to the DMA requests and inputs the DMA requests to the bus arbiter 4. In other words, the information processing apparatus 1 immediately responds to the DMA requests.

Furthermore, in a case where the power of the CM 22 is turned off in a state in which the processes relating to a plurality of DMA requests are held in the TA 5, the TA 5 may be configured to cancel the holding of the processes relating to the DMA requests in the descending order of the remaining holding time of the DMA request out of DMA requests of which the holding times have not expired. In addition, in a case where the holding time of the DMA request held by the TA 5 has expired, it is preferable that the TA 5 cancel the holding of the processes relating to the DMA requests sequentially from a DMA request of which the holding time has expired. Accordingly, an excessive delay of the process relating to the DMA request held by the TA 5 can be prevented, and the influence on the PCI device 3 such as discontinuation of the process at the issuance source of the DMA request can be inhibited.

Next, a holding time setting process of the TA 5 will be described with reference to FIG. 3.

Figure 3:
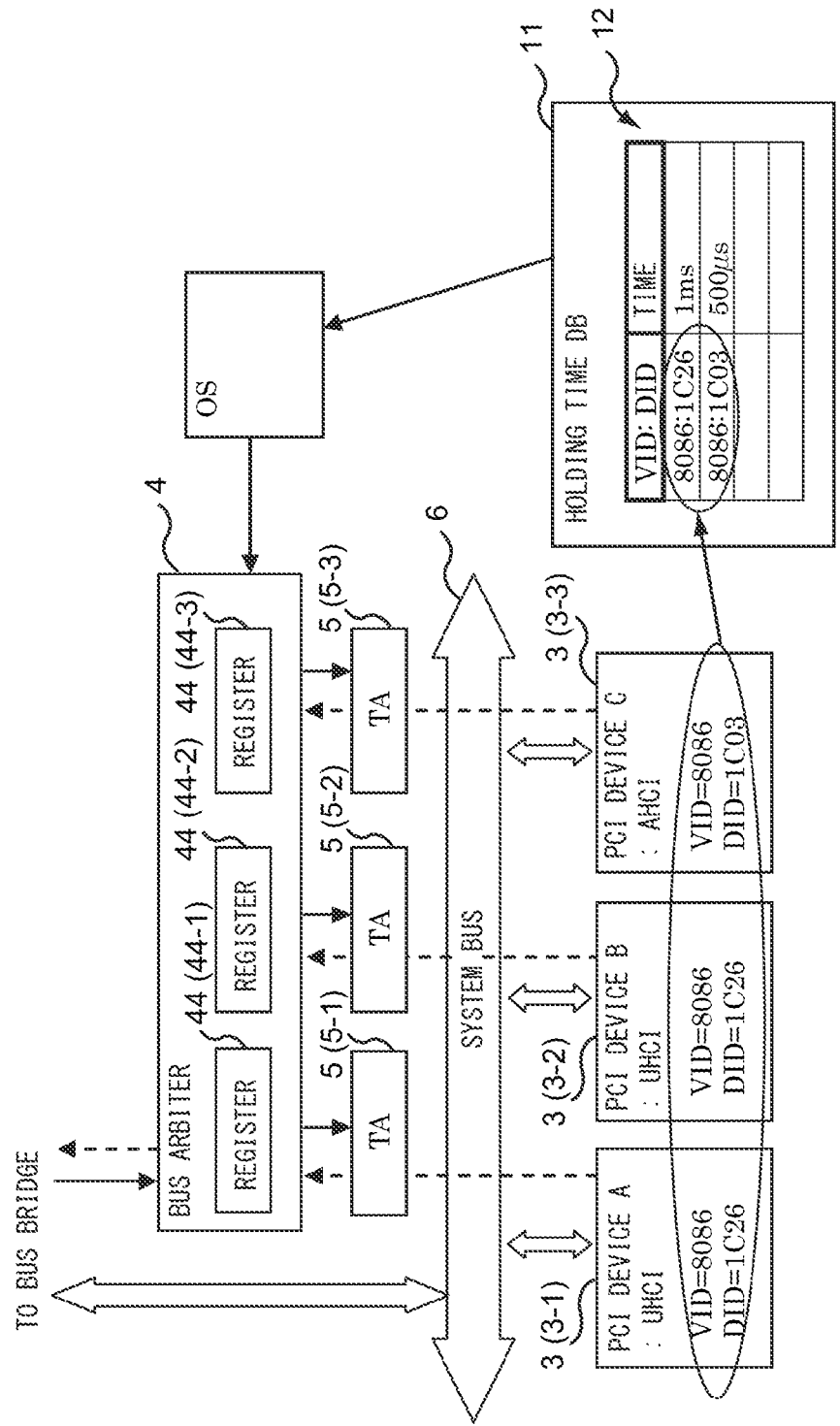
FIG. 3 is a diagram that illustrates an example of a holding time setting process of a TA according to this embodiment.

FIG. 3 is a diagram that illustrates an example of the holding time setting process of the TA 5.

In each PCI device 3, a vendor ID (VID) managed in accordance with the PCI specification and a device ID (DID) managed by each vendor are set. For example, as illustrated in FIG. 3, "VID=8086 and DID=1C26" is set in the UHCIs as the PCI devices 3-1 and 3-2, and "VID=8086 and DID=1C03" is set in the AHCI as the PCI device 3-3.

In this embodiment, the PCI device 3 is identified using the VID and the DID by the OS or the like, whereby a duplication between devices of different types is avoided, and the characteristics are managed for each device of the same type.

A holding time database (DB) 11 illustrated in FIG. 3 includes a holding time table 12, for example, set in a storage area of an HDD connected to the PCI device 3 or a memory not illustrated in the figure.

The holding time table 12 is a table in which a maximum holding time is associated with each set of a VID and a DID. In the holding time table 12 illustrated in FIG. 3 as an example, a delay limit time (maximum holding time) of "1 ms" is set in the device (UHCI) of "VID=8086 and DID=1C26", and a delay limit time of "500 µs" is set in the device (AHCI) of "VID=8086 and DID=1C03". Such a delay limit time is taken for each device and is read from the PCI device 3 and collected in advance by the OS.

When the information processing apparatus 1 is started, when the PCI device 3 is connected (when the connection configuration of a peripheral device is changed), or the like, the OS acquires the characteristics (maximum holding time) of each device mounted in the information processing apparatus 1 from the holding time table 12 based on the VID and the DID of each device. In addition, the OS sets the maximum holding time for each device that is acquired from the holding time table 12 in one of registers 44-1 to 44-3 (in the following description, it will be simply denoted by reference numeral 44 in a case where the registers 44-1 to 44-3 do not need to be discriminated from one another) corresponding to each device.

Each register 44 of the bus arbiter 4 maintains the set maximum holding time (holding time). Then, the TAs 5-1 to 5-3 acquire the holding times from the corresponding registers 44-1 to 44-3 and holds the processes relating to the DMA requests based on the acquired holding times.

In this manner, the register 44 included in the bus arbiter 4 sets and maintains the holding time used for adjusting the issuance timing of the DMA request based on the PCI bus specification, thereby determining the holding time set in the TA 5. In addition, since the arbitration of the bus of the PCI is a centralized control system, in this embodiment, the timing adjustment of the DMA request issuance employs a centralized management system in the bus arbiter 4 that is a central resource. In this manner, the OS can easily set the holding times by only writing the holding time for each PCI device 3 in each register 44 of the bus arbiter 4. In addition, the TAs 5-1 to 5-3 individually control the timers 5-1$a$ to 5-3$a$ by using the holding times set as described above, thereby managing the holding times of the processes relating to the DMA requests in a flexible manner.

The holding time set for the TA 5 is not limited to the above-described technique, but the holding time may be set by using another technique.

[1-3] Operation Example

Next, an example of the process of a case where DMA requests A to C are generated in the information processing apparatus 1 according to this embodiment that is configured as described above will be described.

First, the sequence of holding the processes relating to the issued DMA requests A to C that is performed by the TA 5 will be described with reference to FIG. 4.

Figure 4:
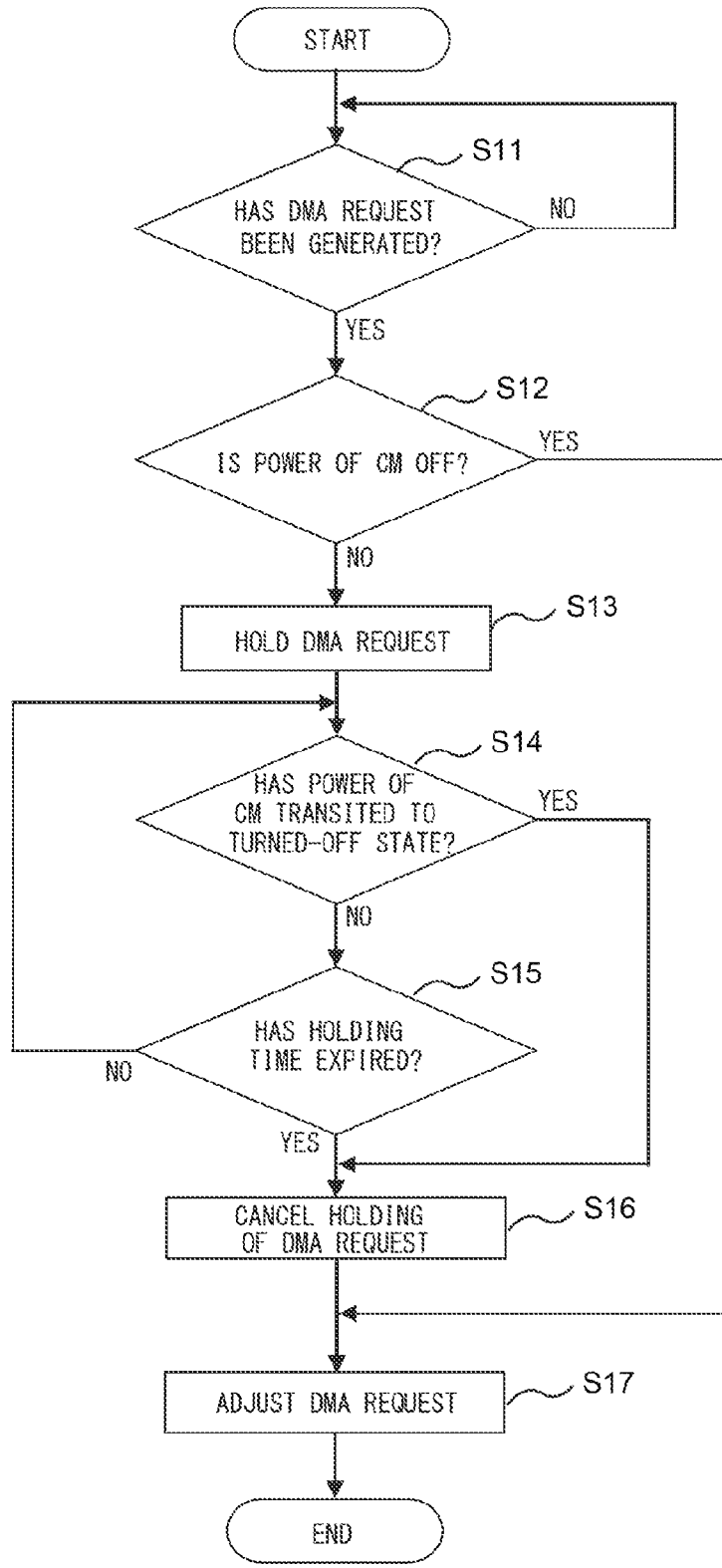
FIG. 4 is a flowchart that illustrates an example of the process of the information processing apparatus according to this embodiment until a DMA request is transmitted to a management unit after DMA requests are generated.

FIG. 4 is a flowchart that illustrates an example of the process of the information processing apparatus 1 according to this embodiment until an DMA request D is transmitted to the management unit 8 after the DMA requests A to C are generated.

Hereinafter, it will be assumed in description that the maximum holding time for each PCI device 3 is acquired from the holding time table 12 in advance and is set in the register 44 of the bus arbiter 4 by the OS.

In the information processing apparatus 1, when the DMA requests A to C are issued from the PCI devices 3 and are input to the TA 5 (Yes Route of Step S11), it is determined whether the power of at least one CM 22 is turned off by the TA 5 (Step S12).

In a case where it is determined that the power of at least one CM 22 is turned off (Yes Route of Step S12), the input DMA requests A to C are output to the bus arbiter 4 by the TA 5, and the DMA requests are arbitrated by the bus arbiter 4 (Step S17).

On the other hand, in Step S12, in a case where it is determined that the power of all the CM's 22 is turned on (No Route of Step S12), the timers 5-1$a$ to 5-3$a$ corresponding to the issuance sources 3 of the DMA requests are initialized by the TA 5, and the output of the input DMA requests A to C to the bus arbiter 4 is held (Step S13).

When the process of Step S13 is performed, it is determined whether or not the power of the CM 22 has transited to the turned-off state by the TA 5 (Step S14). In a case where it is determined that the power of the CM 22 has transited to the turned-off state (Yes Route of Step S14), the holding of the processes relating to the DMA requests A to C is cancelled by the TA 5 (Step S16), the process proceeds to the process of Step S17, and the processes relating to the DMA requests A to C are performed.

On the other hand, in Step S14, in a case where it is determined that the power of any CM 22 is in the turned-on state (No Route of Step S14), it is determined whether or not the holding times have expired based on the values of the timers 5-1$a$ to 5-3$a$ by the TA 5 (Step S15).

In a case where it is determined that the holding times have not expired (No Route of Step S15), the process proceeds to the process of Step S14. On the other hand, in a case where it is determined that the holding times have expired (Yes Route of Step S15), the process proceeds to the process of Step S16.

Next, operations until DMA is performed after the DMA requests A to C are generated will be described with reference to FIG. 5.

Figure 5:
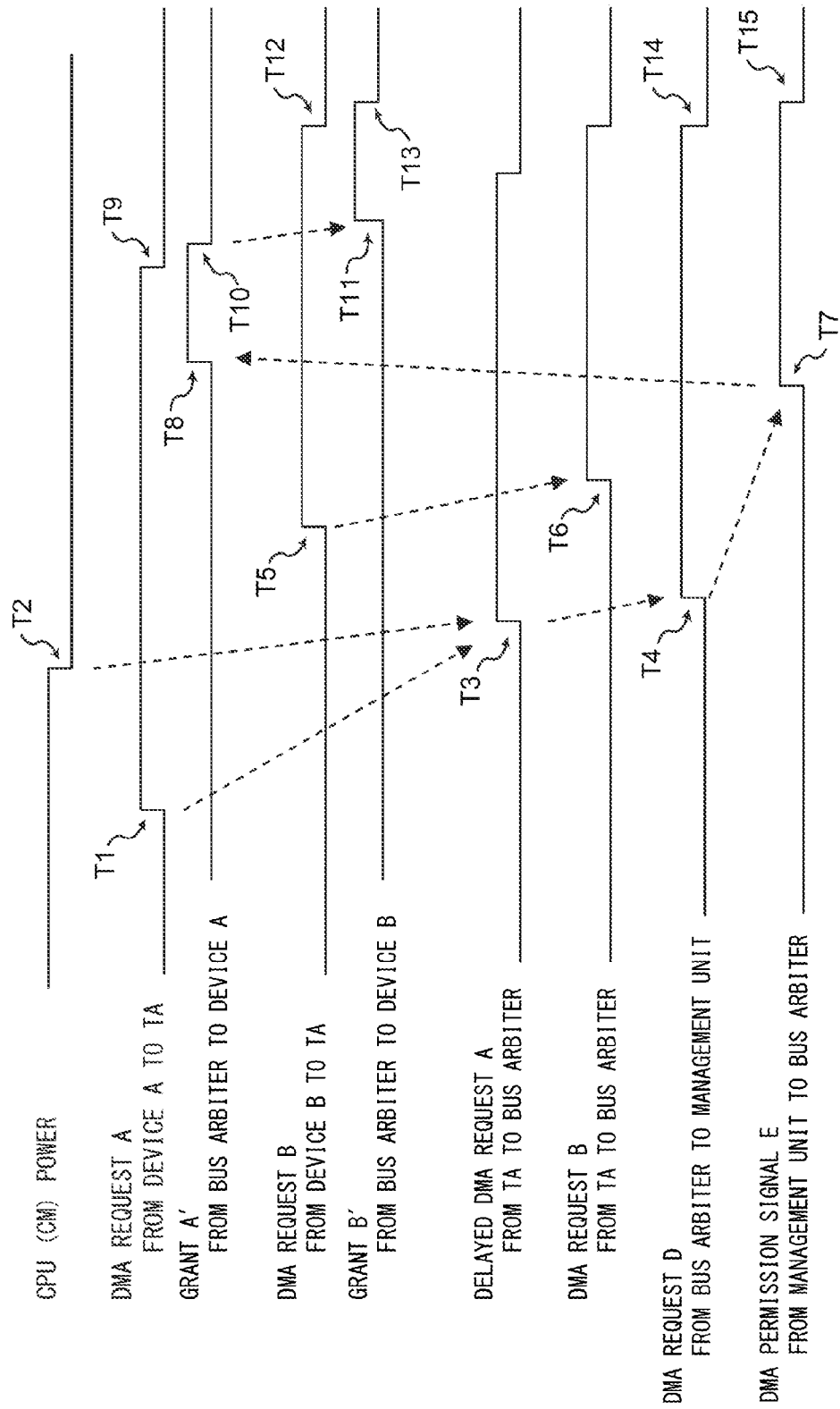
FIG. 5 is a timing diagram that illustrates the operations of the information processing apparatus according to this embodiment until DMA is performed after DMA requests are generated.

FIG. 5 is a timing diagram that illustrates the operations of the information processing apparatus 1 according to this embodiment until DMA is performed by the PCI device 3 after the DMA requests A to C are generated.

In FIG. 5, the PCI device 3-1 is represented by device A, and the PCI device 3-2 is represented by device B.

First, at timing T1, a DMA request A is issued from the PCI device 3-1 to the TA 5-1. Since the power of the CM 22 is in the turned-on state at timing T1, the process relating to the DMA request A is held during the holding time (maximum holding time) set in the register 44-1 by the timer 5-1a in the TA 5-1.

When the power of the CM 22 transits to the turned-off state at timing T2, in the TA 5-1, the holding of the process relating to the DMA request according to the timer 5-1a is canceled, and, a delayed DMA request (hereinafter, referred to as a delayed DMA request) A is output to the bus arbiter 4, at timing T3.

The bus arbiter 4 to which the delayed DMA request A has been input issues a DMA request D to the management unit 8 through the bus bridge 7 using the arbitration processing unit 42 at timing T4.

In addition, at timing T5, a DMA request B is issued from the PCI device 3-2 to the TA 5-2. At timing T5, since the power of the CM 22 is in the turned-off state, in the TA 5-2, the holding of the process relating to the DMA request B according to the timer 5-2a is not performed, and the DMA request B is output to the bus arbiter 4 at timing T6.

It is checked that the host bus 81 is not used by the bus arbiter 82 in the management unit 8 to which the DMA request D has been input, and a DMA permission signal E is asserted at timing T7.

In the bus arbiter 4, when the DMA permission signal E is asserted, the input DMA requests A and B are arbitrated by the arbitration processing unit 42. In the example illustrated in FIG. 5, the bus arbiter 4 selects (accepts) the DMA request A and outputs an output signal (DMA permission; denoted by "Grant" in FIG. 5) A' to the PCI device 3-1 at timing T8.

Subsequently, when the memory access according to the DMA is performed by the PCI device 3-1 to which the output signal A' has been input as a winner of the arbitration, and the DMA is completed, the DMA request A is withdrawn (timing T9). When the DMA request A is withdrawn, in the bus arbiter 4, the issuance of the output signal A' is stopped at timing T10 by the arbitration processing unit 42, the DMA request B that is in the waiting state is selected (accepted), and an output signal B' is output to the PCI device 3-2 at timing T11.

Then, when the DMA is performed by the PCI device 3-2 to which the output signal B' has been input, and the DMA is completed, the DMA request B is withdrawn (timing T12). When the DMA request B is withdrawn, in the bus arbiter 4, the issuance of the output signal B' is stopped at timing T13 by the arbitration processing unit 42.

In addition, since all the input DMA requests have been withdrawn, in the bus arbiter 4, the issuance of the DMA request D is stopped at timing T14, and the issuance of the DMA permission signal E is stopped at timing T15 in the management unit 8.

The DMA request D is issued from the bus arbiter 4 while at least one of the DMA requests A to C is input to the bus arbiter 4. In addition, the DMA permission signal E is asserted while the DMA request D is input to the management unit 8, and the host bus 81 can be open for the DMA.

In this manner, according to the information processing apparatus 1 of this embodiment, when the process relating to the DMA request is held by the TA 5, and at least one CM 22 is in the power cut-off state, DMA is permitted to the issuance source of the DMA request, whereby the DMA is performed without performing the bus snoop operation using the CPU 2. For example, in the information processing apparatus 100 illustrated in FIG. 14, in a case where the DMA requests A and B are generated at timings as illustrated in FIG. 5, since the DMA request A is issued when the power of the CPU 2 (the CM 22) is in the turned-on state, the DMA relating to at least the DMA request A causes the CPU 2 to generate the bus snoop operation.

Therefore, according to the information processing apparatus 1 of this embodiment, the power consumption relating to the bus snoop operation performed when the DMA is performed can be inhibited. In addition, since the DMA is performed when the power of the CPU 2 (the CM 22) is in the turned-off state, the power of the CM 22 does not transit from the turned-off state to the turned-on state for the DMA, whereby the power consumption for starting the CM 22 can be suppressed.

In addition, the power consumption that can be reduced by the information processing apparatus 1 changes in accordance with the operation state of the system and the requirement specifications of various devices. For example, by configuring the system such that the period of the interval timer relating to the interrupt IRQ of the OS and the period of the issuance of the DMA requests A to C according to the PCI device 3 to coincide with each other, since the DMA request is issued when the CPU 2 (the CM 22) is in the power cut-off state, the power consumption for starting the CM 22 or the bus snoop can be suppressed. For example, in a case where the power consumption of the CM 22 occupies 40% of the total power consumption of the CPU 2, 40% of the power consumption in the CPU 2 that is in the idle state can be reduced. In addition, in a case where the period of the interval timer and the period of the issuance of the DMA requests A to C coincide with each other, the holding time of the DMA requests can be suppressed, and the processing time relating to the DMA does not increase.

Furthermore, the TA 5 according to this embodiment cancels the holding of the process according to the DMA request in a case where the holding time has expired, and accordingly, even in a case where the power of the CM 22 is not turned off during the holding time, the information processing apparatus 1 can reliably perform the process relating to the DMA request.

Figure 14:
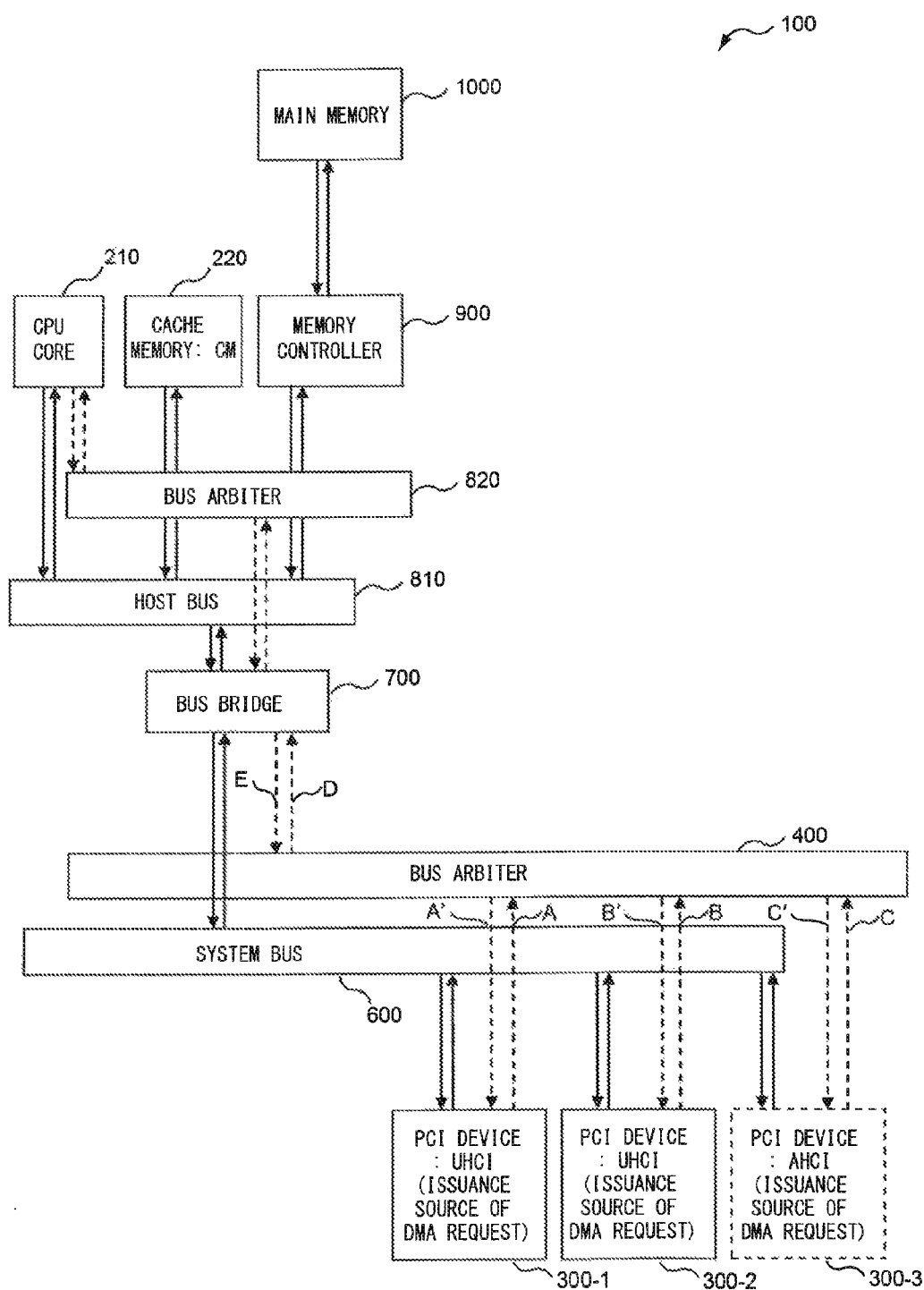
FIG. 14 is a diagram that illustrates an example of the configuration of a computer system including a device that issues a DMA request.
Figure 15:
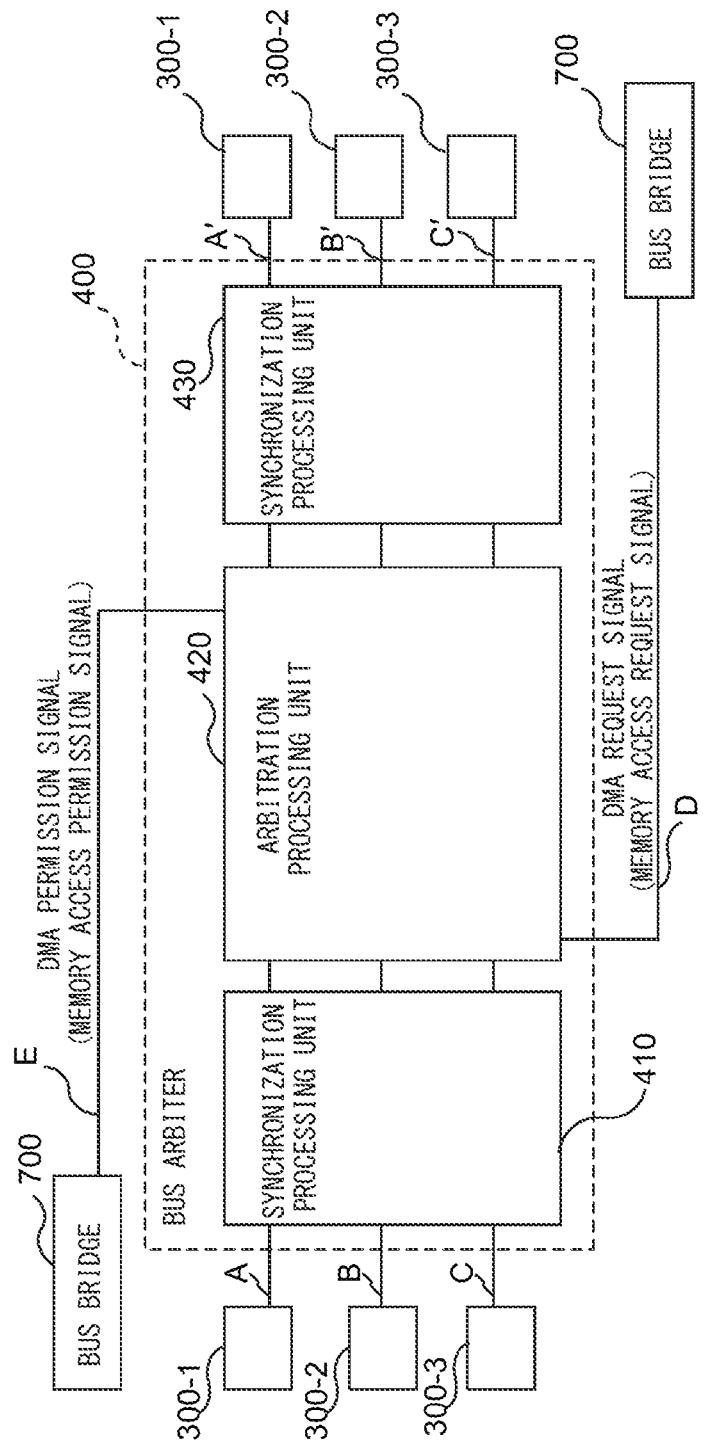
FIG. 15 is a diagram that illustrates an example of the configuration of a bus arbiter performing arbitration of DMA requests in a multi-master system.

In addition, while the power of at least one CM 22 is in the turned-off state, the TA 5 inhibits the holding of the process relating to the DMA request issued by the PCI device 3, and accordingly, in a case where the power of the CM 22 is in the turned-off state when the DMA request is generated, the processing time relating to the DMA can be suppressed to the same degree of a case of the information processing apparatus 100 illustrated in FIG. 14.

Furthermore, the holding time set for the TA 5 is set for each one of the plurality of PCI devices 3, and each holding time is the maximum holding time determined for each corresponding PCI device 3. In this manner, since a holding time that is appropriate for the specification of each PCI device 3 can be set for the TA 5, an excessive delay of the process relating to the DMA request that is held by the TA 5 can be prevented, whereby the influence of the holding of the DMA request on the issuance source can be inhibited.

[1-4] First Modified Example

In the above-described information processing apparatus 1, although the timers 5-1a to 5-3a of the TA 5 that correspond to the number of the PCI devices 3 as the bus masters are included, the number of the timers is not limited thereto, and one timer may be included for the PCI devices 3.

Figure 6:
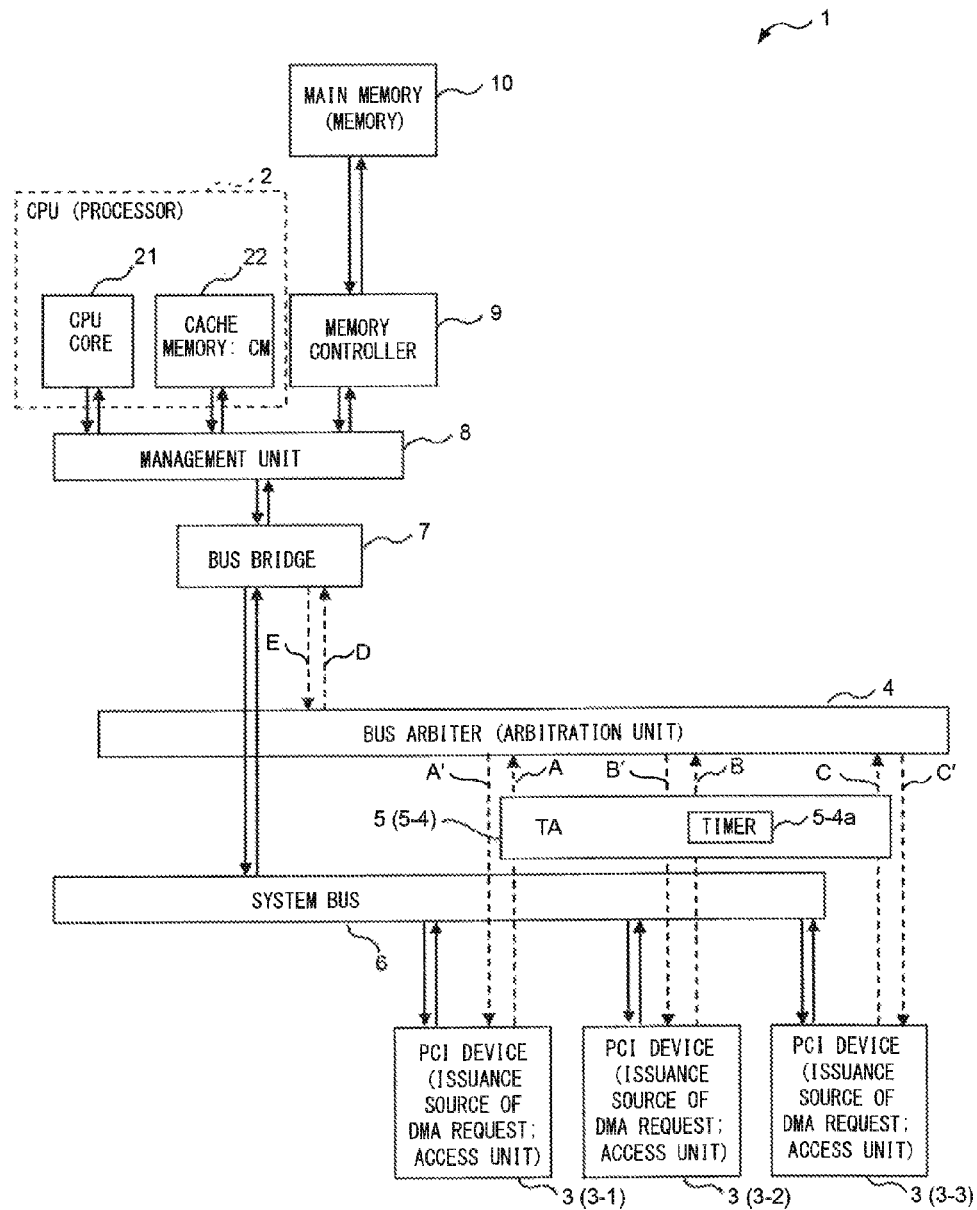
FIG. 6 is a diagram that illustrates the configuration of an information processing apparatus according to a first modified example of this embodiment.
Figure 7:
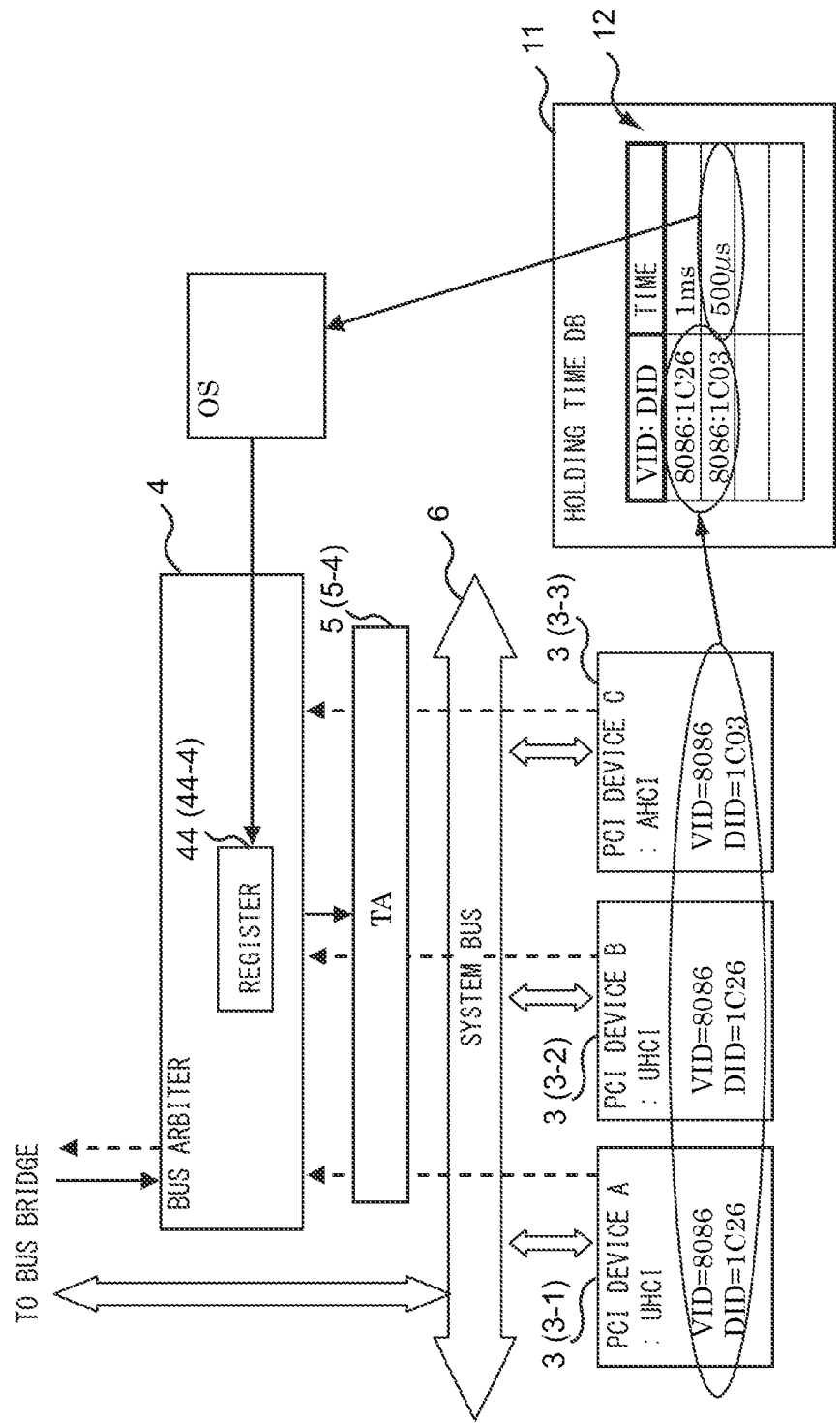
FIG. 7 is a diagram that illustrates a holding time setting process of a TA according to the first modified example of this embodiment.
Figure 8:
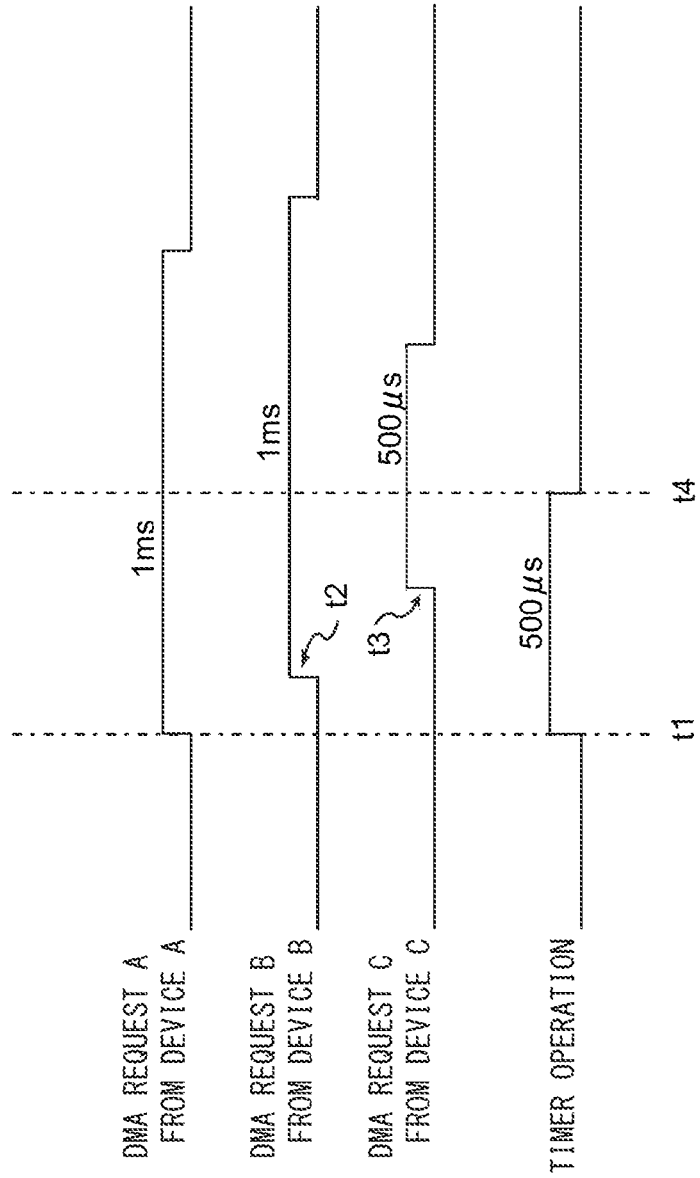
FIG. 8 is a diagram that illustrates a holding process of the TA according to the first modified example of this embodiment.

FIG. 6 is a diagram that illustrates the configuration of an information processing apparatus 1 according to a first modified example of this embodiment, FIG. 7 is a diagram that illustrates a holding time setting process of the TA 5 according to the first modified example, and FIG. 8 is a diagram that illustrates a holding process of the TA 5 according to the first modified example.

In the information processing apparatuses 1 illustrated in FIGS. 6 and 7, the same reference numerals as those described above represent the same portions or approximately same portions as those of the information processing apparatuses 1 illustrated in FIGS. 1 and 3, and thus, duplicate description thereof will not be presented.

As illustrated in FIGS. 6 and 7, the information processing apparatus 1 according to the first modified example includes one TA 5-4, and the TA 5-4 includes PCI devices 3-1 to 3-3 and a timer 5-4*a* that is used to be common thereto. In addition, a bus arbiter 4 includes a first register 44-4 that corresponds to the timer 5-4*a* of the TA 5-4.

In the TA 5-4 according to the first modified example, one holding time is set for a plurality of PCI devices 3.

When the process relating to one DMA request is held, in a case where the process relating to another DMA request is held, the TA 5-4 is configured to hold the process relating to the another DMA request by using the remaining holding time in the one DMA request.

In addition, in the first modified example, it is preferable to set a minimum time of the maximum holding times determined for the PCI devices 3 as the holding time (register 44-4) of the TA 5-4. For example, as illustrated in FIG. 7, in the register 44-4, "500 µs" set in the PCI device 3-3 out of the PCI devices 3-1 to 3-3 is set by the OS.

Next, the holding process of the TA 5-4 will be described with reference to FIG. 8.

In the example illustrate in FIG. 8, timings t1 to t3 of the DMA requests A to C represent timings at which the DMA requests are input to the TA 5-4, and a state is illustrated in which the DMA requests A to C are issued until the maximum holding times. In other words, in the example illustrated in FIG. 8, the DMA requests A and B are issued during "1 ms" from the timings t1 and t2 based on the set values represented in the holding time table 12, and the DMA request C is issued during "500 µs" from the timing t3. In addition, in the example illustrated in FIG. 8, the power of the CM 22 is in the turned-on state.

When the DMA requests A to C are input from the PCI devices 3-1 to 3-3 (devices A to C), the TA 5-4 starts counting the holding time using the timer 5-4*a* from the time when the DMA request A that comes first is input (timing t1). While the DMA requests B and C are input to the TA 5-4 while the holding time is counted, the TA 5-4 holds the DMA requests B and C using the remaining holding time in the timer 5-4*a* that is in counting.

Then, in a case where the power of the CM 22 does not transit to the turned-off state until timing t4, in other words, in a case where the holding time according to the timer 5-4*a* has expired, the TA 5-4 cancels the holding of the processes relating to the DMA requests A to C and outputs the DMA requests to the bus arbiter 4.

As above, according to the information processing apparatus 1 of the first modified example, the same advantages as those of the information processing apparatus 1 according to the above-described embodiment can be acquired, and only one TA 5 (timer 5-4*a*) is included, and accordingly, the circuit configuration can be simplified, whereby the manufacturing cost and the like can be suppressed.

In addition, the process relating to the late DMA request is held using the remaining holding time of the DMA request that comes first by the TA 5-4, and the holding time set for the TA 5-4 is a minimum time of the maximum holding times determined for the PCI devices 3. Accordingly, even when a plurality of DMA requests are input to the TA 5-4, an excessive delay of the process relating to the DMA request that is held by the TA 5 can be prevented, whereby the influence of the holding of the DMA request on the issuance source can be suppressed.

[1-5] Second Modified Example

In the information processing apparatuses 1 according to the above-described embodiment and the first modified example, while the TA 5 is provided between the PCI device 3 and the arbiter 4, the present invention is not limited thereto, but the TA 5 may be provided between the bus arbiter 4 and the bus bridge 7.

Figure 9:
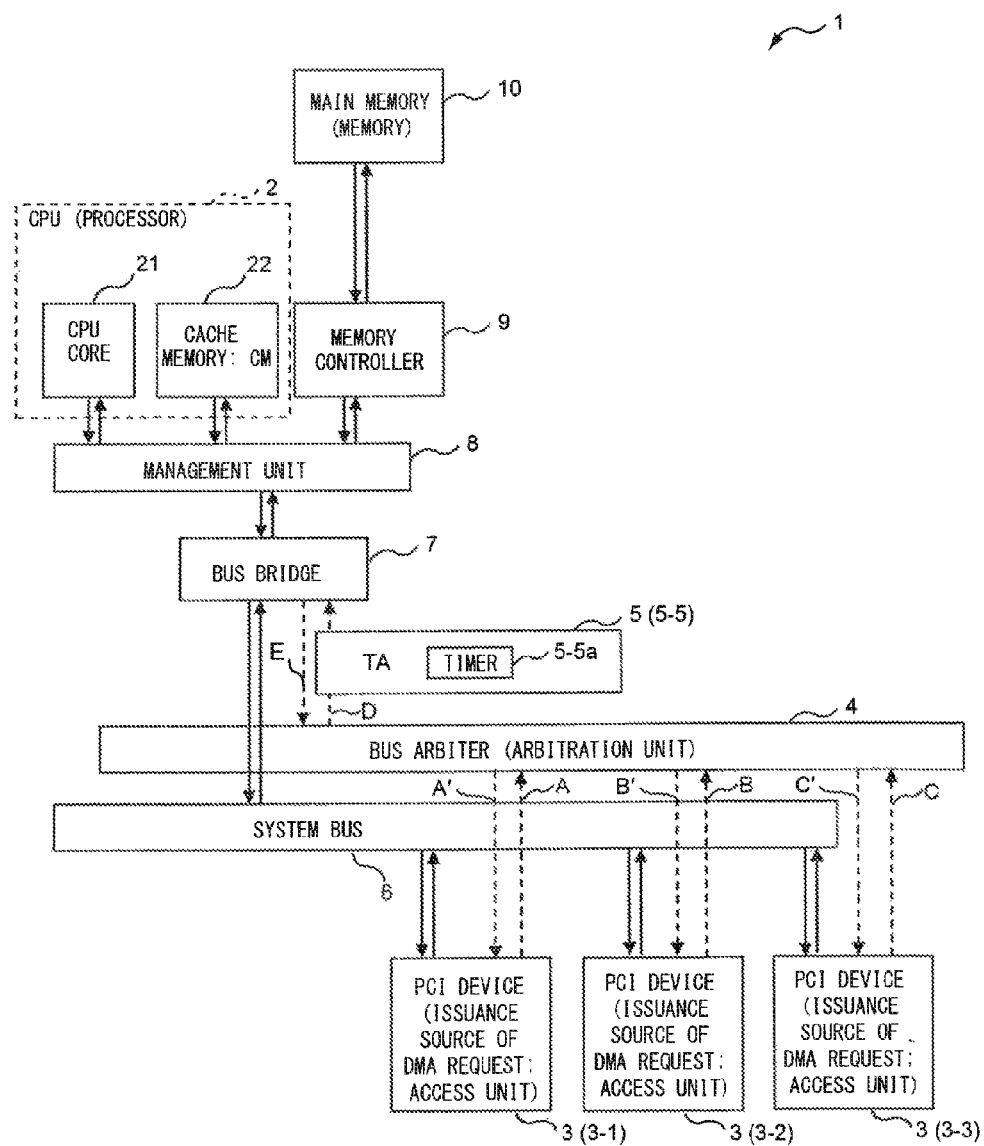
FIG. 9 is a diagram that illustrates the configuration of an information processing apparatus according to a second modified example of this embodiment.
Figure 10:
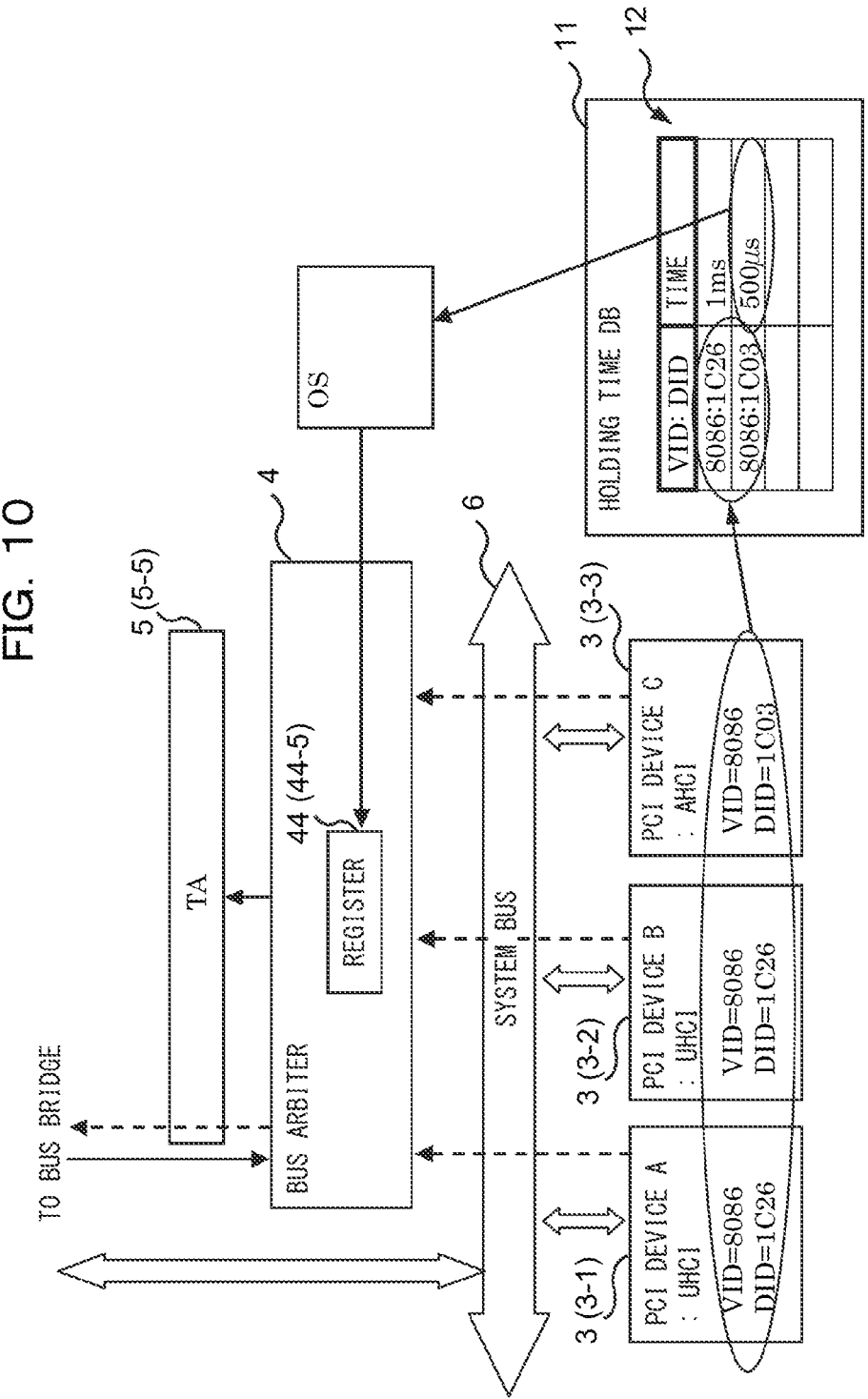
FIG. 10 is a diagram that illustrates a holding time setting process of a TA according to the second modified example of this embodiment.
Figure 11:
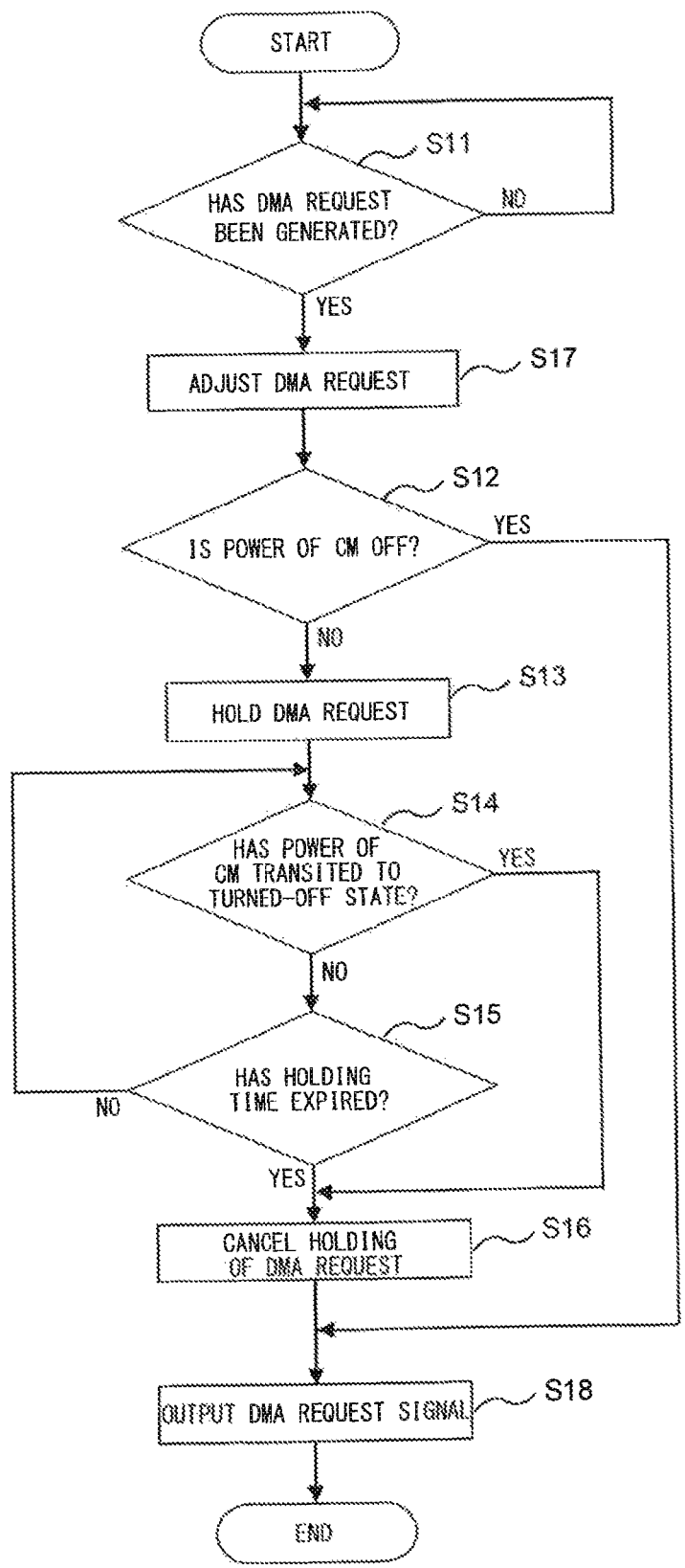
FIG. 11 is a flowchart that illustrates the process of the information processing apparatus according to the second modified example of this embodiment until a DMA request is transmitted to a management unit after the DMA request is generated.

FIG. 9 is a diagram that illustrates the configuration of an information processing apparatus 1 according to a second modified example of this embodiment, FIG. 10 is a diagram that illustrates a holding time setting process of the TA 5 according to the second modified example, and FIG. 11 is a flowchart that illustrates the process of the information processing apparatus 1 according to the second modified example until an DMA request D is transmitted to the management unit 8 after the DMA request is generated.

In the information processing apparatuses 1 illustrated in FIGS. 9 and 10, the same reference numerals as those described above represent the same portions or approximately same portions as those of the information processing apparatuses 1 illustrated in FIGS. 1 and 3, and thus, duplicate description thereof will not be presented.

As illustrated in FIGS. 9 and 10, the information processing apparatus 1 according to the second modified example includes one TA 5-5, and the TA 5-5 includes one timer 5-5*a* that corresponds to the bus arbiter 4.

The TA 5-5 according to the second modified example holds the issuance of a DMA request D that is output from the bus arbiter 4. In other words, the TA 5-5 holds the issuance process of the DMA request D to the management unit 8 according to the bus arbiter 4 for a predetermined holding time as the process relating to the DMA request.

In addition, the bus arbiter 4 includes one register 44-5 that corresponds to the TA 5-5.

In the second modified example, the TA 5-5, similar to the first modified example, sets one holding time for a plurality of the PCI devices 3.

In addition, in the second modified example, similar to the first modified example, it is preferable to set a minimum time of the maximum holding times determined for the PCI devices 3 as the holding time (register 44-5) of the TA 5-5.

Next, the process of the information processing apparatus 1 according to the second modified example configured as described above in a case where DMA requests are generated will be described with reference to FIG. 11.

In the process illustrated in FIG. 11, the same reference numerals as those described above represent the same portions or approximately same portions as those of the process illustrated in FIG. 4, and thus, duplicate description thereof will not be presented.

In the information processing apparatus 1, when a DMA request is issued from the PCI devices 3 and is input to the bus arbiter 4 (Yes Route of Step S11), the DMA request is arbitrated by the bus arbiter 4 (Step S17).

Then, when the DMA request D is output to the TA 5-5 by the bus arbiter 4, the processes of Steps S12 to S16 are performed by the TA 5-5.

When the process of Step S16 or a determination of the Yes route in Step S12 is performed, the DMA request D is output to the management unit 8 through the bus bridge 7 by the TA 5-5 (Step S18).

In this manner, according to the information processing apparatus 1 of the second modified example, the same advantages as those of the information processing apparatuses 1 according to the above-described embodiment and the first modified example can be acquired.

In addition, since the issuance of the DMA request D from the bus arbiter 4 to the management unit 8 is held by the TA 5-5, only one DMA request D may be input, and, unlike the TA 5-4 according to the first modified example, a plurality of DMA requests A to C are not input. Accordingly, the TA 5-5 can be configured to have a configuration that is simpler than the TA 5-4 according to the first modified example, whereby the manufacturing cost and the like can be suppressed.

[2] Others

As above, while a preferred embodiment of the present invention has been described in detail, the present invention is not limited to a specific embodiment and a specific modified example, and various modifications and changes can be made therein in the range not departing from the concept of the present invention.

For example, in a case where the processes relating to a plurality of the DMA requests A to C are held by the TA 5, in other words, in a case where a plurality of DMA requests are generated at the same time, the TA 5 may perform the process of rounding up the holding time, in other words, subtracting a predetermined time from the remaining holding time or changing the remaining holding time to a predetermined time or the like. In this manner, an excessive delay of the process relating to the DMA request that is held by the TA 5 can be prevented.

In addition, in consideration of times (maximum holding times) waiting for the PCI devices 3, in a case where a plurality of DMA requests are input, the bus arbiter 4 may perform an arbitration process in which a DMA request issued from a PCI device 3 having a shortest maximum holding time is permitted first.

In addition, the information processing apparatus 1 may combine the TAs 5-1 to 5-4 that are provided in correspondence with the PCI devices 3 in the above-described embodiment or the first modified example and the TA 5-5 that is provided only below the bus bridge 7 in the second modified example. Furthermore, the TA 5 may be provided in the bus arbiter 4.

Furthermore, in the above-described embodiment and each modified example, while the case in which there is one CPU 2 (the CM 22) has been described, the present invention is not limited thereto, but a plurality of the CM's 22 may be provided. For example, in the case of a system in which multiple CPUs or a multi-core CPU is mounted, the CM may be provided for each CPU core, or a CM that is shared by a plurality of CPUs may be provided. In such a case, the TA 5 may determine whether or not the process relating to a DMA request is to be held in accordance with whether or not the power of at least one CM is in the turned-off state. In this manner, also in the system in which a plurality of CM's are provided, when the DMA is performed in the state in which the power of at least one CM is in the turned-off state, the power consumption can be lowered, compared to a case where the power of all the CM's is in the turned-on state.

Figure 12:
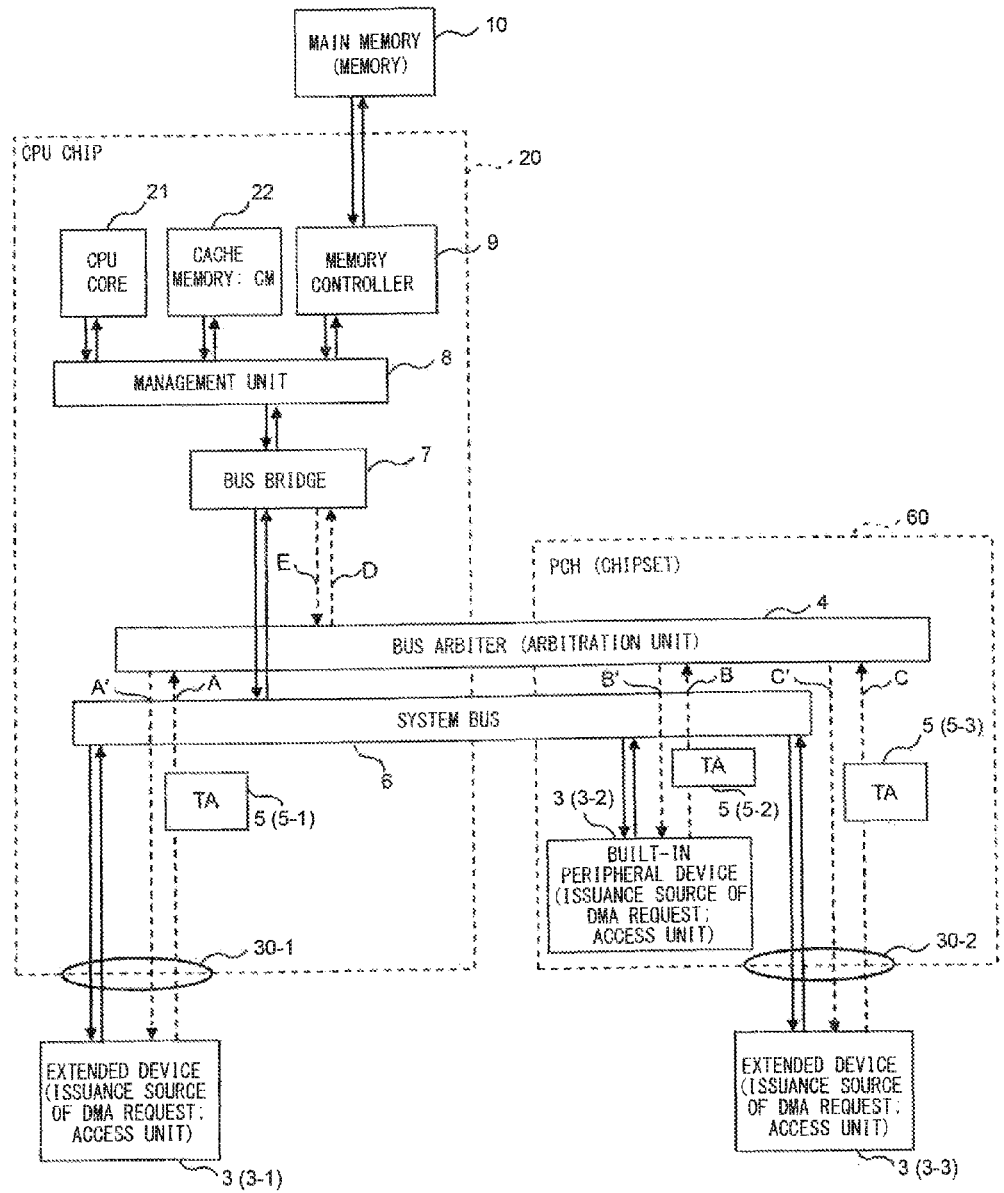
FIG. 12 is a diagram that illustrates an example of the application of the information processing apparatus according to this embodiment to a system.

In addition, the configuration of the information processing apparatus 1 described above may be applied to a system in which a bus, a controller, and the like are integrated within a chip, for example, like a system illustrated in FIG. 12.

Figure 13:
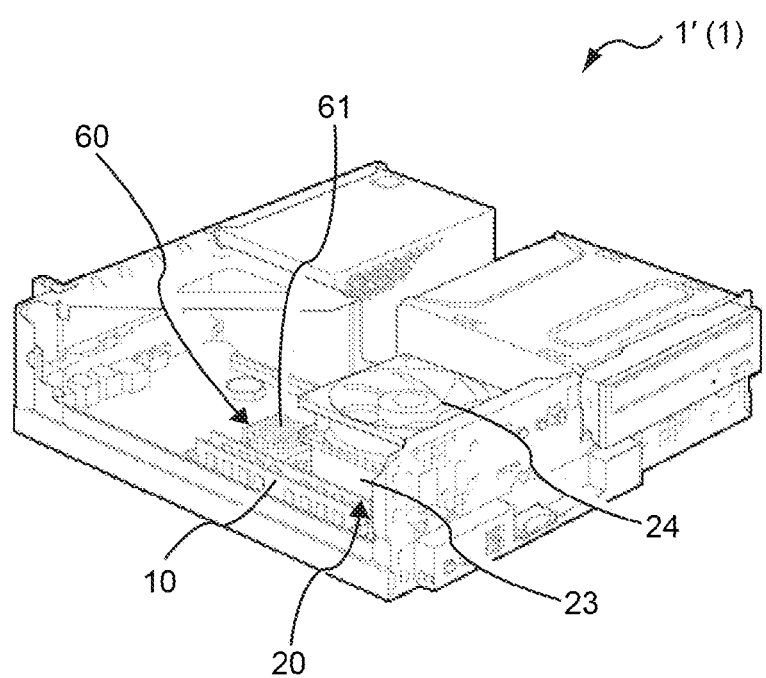
FIG. 13 is a diagram that illustrates an example of the hardware configuration of the information processing apparatus according to this embodiment.

FIG. 12 is a diagram that illustrates an example of the application of the information processing apparatus 1 according to this embodiment to a system, and FIG. 13 is a diagram that illustrates an example of the hardware configuration of an information processing apparatus 1'.

In the information processing apparatus 1' illustrated in FIG. 12, the same reference numerals as those described above represent the same portions or approximately same portions as those of the information processing apparatuses 1 illustrated in FIG. 1, and thus, duplicate description thereof will not be presented.

The information processing apparatus 1' includes a CPU chip 20 in which the CPU core 21, the CM 22, the TA 5-1, a part of the bus arbiter 4, a part of the system bus 6, the bus bridge 7, the management unit 8, and the memory controller 9 are revised and recorded. In addition, the information processing apparatus 1' includes a platform controller hub (PCH; hereinafter referred to as a PCH chip) 60 in which the PCI device 3-2 as a built-in peripheral device, the TAs 5-2 and 5-3, a part of the bus arbiter 4, and a part of the system bus 6 are integrated.

The CPU chip 20 and the PCH chip 60 are respectively include interface units 30-1 and 30-2. The interface units 30-1 and 30-2, for example, are ports of the PCI-Express, and the PCI devices 3-1 and 3-3 as the peripheral devices (expansion devices) are connected to the CPU chip 20 and the PCH chip 60 through the ports. Here, the PCI-Express is an interface that performs the operation of the PCI using a high-speed serial bus. As illustrated in FIG. 13, the CPU chip 20 is provided below a heat sink 23 and a pan 24, and the PCH chip 60 is provided below a heat sink 61 (and a fan).

In addition, in the information processing apparatus 1', in a logical manner, as denoted by solid lines, devices are connected through a virtual system bus 6, and the main memory 10 is shared by all the devices. Here, this system bus 6 logically operates as a PCI bus. A DMA request generated in the information processing apparatus 1' is processed in accordance with the specification of the PCI bus.

As above, currently, the PCI bus is integrated inside the CPU chip 20 or the chip set 60, and a connection of the PCI bus to the outside of the chip is frequently realized as the PCI-Express. Signals exchanged between the CPU chip 20 and the PCH chip 60 are transmitted by using high-speed serial signals. Since the chip size and the number of terminals of the integrated circuit are practical conditions, such a physical configuration is in the mainstream.

The present invention is not limited to the physical configurations such as the information processing apparatuses 1 and 1' described above. Thus, according to the information processing apparatus 1', the functions of the above-described embodiment and each modified example can be provided, and the advantages as described above can be acquired.

According to the disclosed technology, the power consumption of a case where a memory access such as a DMA is generated can be reduced in an information processing apparatus.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
    at least one access unit that issues a memory access request for a memory;
    an arbitration unit that arbitrates the memory access request issued from the access unit;
    a management unit that allows the access unit that is an issuance source of the memory access request according to a result of the arbitration made by the arbitration unit to perform a memory access to the memory;
    a processor that accesses the memory through at least one cache memory; and
    a timing adjusting unit that suspends a process relating to the memory access request issued by the access unit for a suspending time set in advance, and cancels the suspending of the process relating to the memory access request when power of the at least one cache memory is turned off in the processor before the suspending time expires.

2. The information processing apparatus according to claim 1, wherein the timing adjusting unit cancels the suspending of the process relating to the memory access request when the suspending time expires.

3. The information processing apparatus according to claim 1, wherein the suspending time for each one of a plurality of the access units is set for the timing adjusting unit, and the timing adjusting unit suspends the process relating to the memory access request for a suspending time corresponding to the access unit that is an issuance source of the memory access request.

4. The information processing apparatus according to claim 3, wherein the suspending time that is set for the timing adjusting unit is a maximum suspending time determined for each corresponding access unit.

5. The information processing apparatus according to claim 3, wherein, in a case where the power of the cache memory is turned off, among memory access requests of which the suspending times have not expired, the timing adjusting unit cancels the suspending of the processes relating to the memory access requests in the ascending order of remaining suspending times of the memory access requests.

6. The information processing apparatus according to claim 3, wherein the timing adjusting unit sequentially cancels the suspending of the processes relating to the memory access requests starting from the memory access request of which the suspending time has expired.

7. The information processing apparatus according to claim 1, wherein one suspending time to a plurality of the access units is set for the timing adjusting unit and, when the process relating to one memory access request is suspended, in a case where the process relating to another memory access request is to be suspended, the timing adjusting unit suspends the process relating to the another memory access request by using a remaining suspending time of the one memory access request.

8. The information processing apparatus according to claim 7, wherein the suspending time set for the timing adjusting unit is a minimum time of maximum suspending times that are respectively determined for the access units.

9. The information processing apparatus according to claim 1, wherein one suspending time to a plurality of the access units is set for the timing adjusting unit, the timing adjusting unit is included between the arbitration unit and the management unit, and suspends the issuance of the memory access request from the arbitration unit to the management unit.

10. The information processing apparatus according to claim 1, wherein the timing adjusting unit is included between the access unit and the arbitration unit and suspends the issuance of the memory access request from the access unit to the arbitration unit.

11. The information processing apparatus according to claim 1, wherein the timing adjusting unit inhibits the suspending of the process relating to the memory access request issued by the access unit while the power of the at least one cache memory is turned off.

12. The information processing apparatus according to claim 1, wherein
    the management unit transmits a memory access permission signal in a case where the access to the memory is permitted for the memory access request from the arbitration unit,
    the arbitration unit permitted to access the memory by the management unit in accordance with the memory access permission signal issues a memory access permission to the access unit according to an arbitration result, and
    the access unit receiving the memory access permission performs a memory access to the memory in accordance with the issued memory access permission.

13. The information processing apparatus according to claim 1, wherein the arbitration unit includes a register in which the suspending time set for the timing adjusting unit is maintained.

14. The information processing apparatus according to claim 1, wherein the memory access request issued by the access unit for the memory is a direct memory access (DMA) request.

15. The information processing apparatus according to claim 1, wherein the access unit is a host controller.

16. A scheduling method for a memory access request in an information processing apparatus, the scheduling method comprising:
    issuing the memory access request for a memory, by at least one access unit;
    arbitrating the memory access request issued from the access unit, by an arbitration unit;
    allowing, by a management unit, the access unit that is an issuance source of the memory access request according to a result of the arbitration made by the arbitration unit to perform a memory access to the memory;
    accessing the memory through at least one cache memory, by a processor; and
    suspending a process relating to the memory access request issued by the access unit for a suspending time set in advance, and canceling the suspending of the process relating to the memory access request when power of the at least one cache memory is turned off in the processor before the suspending time expires.

17. The scheduling method according to claim 16, wherein the scheduling method further comprises canceling the suspending of the process relating to the memory access request in a case where the suspending time expires.

18. The scheduling method according to claim 16, wherein the suspending time is set for each one of a plurality of the access units, and the scheduling method further comprises suspending the process relating to the memory access request for a suspending time corresponding to the access unit that is an issuance source of the memory access request.

19. The scheduling method according to claim 18, wherein the scheduling method further comprises, in a case where the power of the cache memory is turned off, among memory access requests of which the suspending times have not expired, canceling the suspending of the processes relating to the memory access requests in the ascending order of remaining suspending times of the memory access requests.

20. The scheduling method according to claim 16, wherein one suspending time is set to a plurality of the access units, and the scheduling method further comprises, when the process relating to one memory access request is suspended, in a case where the process relating to another memory access request is to be suspended, suspending the process relating to the another memory access request by using a remaining suspending time of the one memory access request.

* * * * *